United States Patent [19]

Okazaki

[11] Patent Number: 5,794,078
[45] Date of Patent: Aug. 11, 1998

[54] IMAGE MOVEMENT CORRECTION OF CAMERA

[75] Inventor: Mitsuhiro Okazaki, Kawasaki, Japan

[73] Assignee: Nikon Corporation, Tokyo, Japan

[21] Appl. No.: 709,092

[22] Filed: Sep. 6, 1996

[30] Foreign Application Priority Data

Sep. 11, 1995 [JP] Japan ................................. 7-232387
Feb. 13, 1996 [JP] Japan ................................. 8-025622

[51] Int. Cl.$^6$ ................................................ G03B 5/00
[52] U.S. Cl. ................................ 396/50; 396/53; 396/55
[58] Field of Search ............................ 396/50, 53, 55, 396/52, 89, 80, 81, 82, 91, 93; 348/208; 359/554–557

[56] References Cited

U.S. PATENT DOCUMENTS 3,455,221  7/1969  Reekie .
5,335,032  8/1994  Onuki et al. ........................... 396/53

Primary Examiner—W. B. Perkey

[57] ABSTRACT

An image correcting camera, for precisely detecting translational vibrations of the camera and precisely correcting an image shake, includes an acceleration detector for detecting tri-axis directional accelerations acting on the camera, an angular velocity detector for detecting angular velocities about the tri-axes that act upon the camera, an attitude calculating device for calculating a coordinate transform matrix between a camera coordinate system and a static coordinate system from the tri-axis directional accelerations and the angular velocities about the tri-axes, and a gravitational acceleration component calculating device for calculating a gravitational acceleration component in the camera coordinate system from the coordinate transform matrix. An initial velocity is calculated from the acceleration with an elimination of the gravitational acceleration component, and a velocity is calculated from the acceleration thereof and the initial velocity. A displacement is calculated from this velocity. A correction drive quantity calculating device calculates an image shake quantity based on these values.

60 Claims, 20 Drawing Sheets

GRAVITATION

GRAVITATION

IMAGE MOVEMENT CORRECTION OF CAMERA

BACKGROUND OF THE INVENTION

1. Field of the Invention

The present invention relates to an image correcting camera for correcting an image shake due to a camera shake caused during a photographic operation.

2. Related Background Art

A known conventional image correcting camera includes an image-shake correcting device for correcting an image shake caused during a photographing process. The image-shake correcting device, when a shake sensor incorporated into the camera detects the shake, corrects the image shake by moving a correction lens provided in a part of a photographing lens system to offset the shake based on an output of the shake sensor for a duration of opening of a shutter.

FIGS. 17 and 18 are block diagrams respectively showing first and second examples of the prior art image correcting cameras that are disclosed in Japanese Patent Laid-Open Application Nos. 3-37616 and 3-46642. Further, FIG. 19 is a view schematically illustrating a construction of a correction optical device of the image correcting camera (Japanese Patent Laid-Open Application No. 5-158100).

The image correcting camera shown in FIG. 17 has angular velocity detectors 23, 24, a correction drive quantity calculating unit 25 and a correction driving device 26.

The angular velocity detectors 23, 24 detect angular velocities (shakes) about X- and Y-axes of the camera, which are orthogonal to an optical axis of the camera.

A correction drive quantity calculating unit 25 calculates a drive quantity of a correction lens 38 to offset the shake on the basis of displacements (angles of rotations) in the X- and Y-axis directions that are calculated from outputs of the angular velocity detectors 23, 24.

A correction driving device 26 moves the correction lens 38 in accordance with the calculated drive quantity and thus corrects the image shake occurring in the camera.

The image correcting camera shown in FIG. 18 includes acceleration detectors 27, 28, angular velocity detectors 29, 30, an object distance measuring unit 31, a correction drive quantity calculating unit 32, and a correction driving device 33.

The acceleration detectors 27, 28 detect the accelerations in the X- and Y-axis directions.

The angular velocity detectors 29, 30 detect the angular velocities about the X- and Y-axes.

The object distance measuring unit 31 measures a distance between the object and the camera.

The correction drive quantity calculating unit 32 calculates a quantity of rotations about the X-axis to offset the shake on the basis of a Y-axis directional displacement (a moving quantity) from an output of the acceleration detector 28, a displacement (an angle of rotation) about the X-axis that is calculated from an output of the angular velocity detector 29 and an output of the object distance measuring unit 31. Similarly, the correction drive quantity calculating unit 32 calculates a quantity of rotations about the Y-axis to offset the shake on the basis of an X-axis directional displacement calculated from the output of the acceleration detector 27, a Y-axis directional displacement calculated from the output of the angular velocity detector 30 and the output of the object distance measuring unit 31.

A correction driving device 33 corrects respectively the Y- and X-axis directional image shakes by rotating an optical system of an imaging device in accordance with the thus calculated drive quantities.

However, there arise the following problems inherent in the above-described prior art image correcting camera.

The camera shown in FIG. 17, because only the angular velocity detectors 23, 24 detect the camera shake, is incapable of detecting the shake in the translational direction of the camera. Accordingly, there exists such a problem that an image shake caused by the shake in the translational direction can not be corrected. Particularly in the case of the photographing magnification being high, the image shake produced due to the shake in the translational direction of the camera is large, and consequently the problem is that an image quality remarkably declines.

Further, in the camera shown in FIG. 18, the acceleration detectors 27, 28 are capable of detecting the translational vibration of the camera. If rotational vibrations of the camera happen, however, the gravitational acceleration component acting on acceleration detectors 27, 28 varies due to the rotational vibrations of the camera. For this reason, the acceleration acting upon the acceleration detectors 27, 28 becomes an acceleration containing the gravitational acceleration component, and is therefore different from the acceleration generated by only the translational vibration of the camera.

Furthermore, the calculation of the velocity by integrating the acceleration entails a value of an initial velocity because of determining an integration constant. However, if the acceleration containing the gravitational acceleration component is used when calculating the initial velocity, it follows that an accuracy for calculating the initial velocity decreases.

On account of the above-mentioned, the translational vibration can not be precisely detected. Therefore, this leads to such a problem that the image shake can not be precisely corrected, and a clear-cut image can not be obtained.

SUMMARY OF THE INVENTION

It is a primary object of the present invention to obtain a clear-cut image by accurately detecting a translational vibration of a camera and thereby precisely correcting an image shake.

To obviate the above-mentioned problems, according to the invention of the present application, an image correcting camera comprises an acceleration detecting unit for detecting accelerations in tri-axis directions, which accelerations act upon the camera, and an angular velocity detecting unit for detecting angular velocities about the tri-axes that act upon the camera. The image correcting camera also comprises an attitude calculating unit for calculating a coordinate transform matrix between a camera coordinate system and a static coordinate system from an initial attitude of the camera with respect to the static coordinate system and from the angular velocities about the tri-axes, a gravitational acceleration component calculating unit for calculating a gravitational acceleration component in the camera coordinate system by use of the coordinate transform matrix, and a displacement calculating unit for calculating an initial velocity from the acceleration with an elimination of the gravitational acceleration component, calculating a velocity from the initial velocity and from the acceleration with an elimination of the gravitational acceleration component, and thus calculating a displacement from the velocity. The image correcting camera further comprises an object distance measuring unit for measuring a distance between the camera and an object, a photographing magnification detecting unit for detecting a photographing magnification of the camera, a correction quantity calculating unit for calculating an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between the camera and the object, and the photographing magnification, and for calculating a drive quantity of a correction lens and/or an imaging surface to offset the image shake quantity, and a correction driving unit for moving the correction lens and/or the imaging surface.

According to the invention of the present application, an image correcting camera comprises an acceleration detecting unit for detecting accelerations in X- and Y-axis directions, which accelerations act upon the camera, an angular velocity detecting unit for detecting angular velocities about the tri-axes that act upon the camera, an attitude detecting unit for detecting an attitude of the camera by detecting a gravitational acceleration direction, and an attitude calculating unit for calculating a coordinate transform matrix between a camera coordinate system and a static coordinate system from the attitude of the camera and from angular velocities about the tri-axes. The image correcting camera also comprises a gravitational acceleration component calculating unit for calculating a gravitational acceleration component in the camera coordinate system by use of the coordinate transform matrix, and a displacement calculating unit for calculating an initial velocity from the acceleration with an elimination of the gravitational acceleration component, calculating a velocity from the initial velocity and from the acceleration with an elimination of the gravitational acceleration component, and thus calculating a displacement from the velocity. The image correcting camera further comprises an object distance measuring unit for measuring a distance between the camera and an object, a photographing magnification detecting unit for detecting a photographing magnification of the camera, a correction drive quantity calculating unit for calculating an image shake quantity on the basis of the displacements in X- and Y-axis directions, angles of rotations about X- and Y-axes that are calculated from the angular velocities about the X- and Y-axes, a distance between the camera and the object, and the photographing magnification, and for calculating a drive quantity of a correction lens and/or an imaging surface to offset the image shake quantity, and a correction driving unit for moving the correction lens and/or the imaging surface.

According to the invention of the present application, an image correcting camera comprises an acceleration detecting unit for detecting accelerations in tri-axis directions, which accelerations act upon the camera, an angular velocity detecting unit for detecting angular velocities about the tri-axes that act upon the camera, and an attitude calculating unit for calculating a coordinate transform matrix between a camera coordinate system and a static coordinate system from an initial attitude of the camera with respect to the static coordinate system and from the angular velocities about the tri-axes. The image correcting camera also comprises a gravitational acceleration component calculating unit for calculating a gravitational acceleration component in the camera coordinate system by use of the coordinate transform matrix, and a displacement calculating unit for calculating an initial velocity from the acceleration with an elimination of the gravitational acceleration component, calculating a velocity from the initial velocity and from the acceleration with an elimination of the gravitational acceleration component, and thus calculating a displacement from the velocity The image correcting camera further comprises an object distance measuring unit for measuring a distance between the camera and an object, a photographing magnification detecting unit for detecting a photographing magnification of the camera, and a correction drive quantity calculating unit for calculating an image shake quantity and a defocus quantity on the basis of the displacements in tri-axis directions, angles of rotations about tri-axes that are calculated from angular velocities about the tri-axes, a distance between the camera and the object, and the photographing magnification, and for calculating drive quantities of the correction lens or the imaging surface and the focusing lens to offset the image shake quantity and the defocus quantity, and a correction driving unit for moving the correction lens or the imaging surface and the focusing lens.

In the image correcting camera according to the invention of the present application, the attitude calculating unit calculates the initial attitude of the camera with respect to the static coordinate system from the gravitational acceleration direction in the camera coordinate system that is obtained from the accelerations in the tri-axis directions.

According to the invention of the present application, an image correcting camera comprises an acceleration detecting unit for detecting an acceleration acting upon the camera, and a velocity calculating unit for calculating a velocity from an acceleration for a period from a first peak to a last peak in a predetermined time interval among the accelerations detected by the acceleration detecting unit by using this acceleration, and by assuming that a displacement of the camera at the first peak value point and a displacement thereof at the last peak value point are equal. The image correcting camera also comprises a displacement calculating unit for calculating a displacement during the correction of the image shake from the velocity calculated by the velocity calculating unit, a correction drive quantity calculating unit for calculating an image shake quantity on the basis of the displacement calculated by the displacement calculating unit, and calculating a drive quantity of the correction lens and/or the imaging surface to offset the image shake quantity, and a correction driving unit for moving the correction lens and/or the imaging surface.

According to the invention of the present application, an image correcting camera comprises an acceleration detecting unit for detecting accelerations acting upon the camera in tri-axis directions, an angular velocity detecting unit for detecting angular velocities about the tri-axes that act upon the camera, and an attitude calculating unit for calculating a coordinate transform matrix between a camera coordinate system and a static coordinate system from an initial attitude of the camera with respect to the static coordinate system and from the angular velocities about the tri-axes. The image correcting camera also comprises a gravitational acceleration component calculating unit for calculating a gravitational acceleration component in the camera coordinate system by use of the coordinate transform matrix, and a velocity calculating unit for calculating a velocity from an acceleration for a period from a first peak value point to a last peak value point in a predetermined time interval among accelerations with an elimination of the gravitational acceleration component, and by assuming that a displacement of the camera at the first peak value point and a displacement thereof at the last peak value point are equal. The image correcting camera further comprises a displacement calculating unit for calculating a displacement during the correction of the image shake from the velocity calculated by the velocity calculating unit, an object distance measuring unit for measuring a distance between the camera and an object, a photographing magnification detecting unit for detecting a photographing magnification of the camera, a correction drive quantity calculating unit for calculating an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between the camera and the object, and the photographing magnification, and for calculating a drive quantity of the correction lens and/or the imaging surface to offset the image shake quantity, and a correction driving unit for moving the correction lens and/or the imaging surface.

According to the invention of the present application, an image correcting camera comprises an acceleration detecting unit for detecting accelerations acting upon the camera in X- and Y-axis directions, an angular velocity detecting unit for detecting angular velocities about tri-axes that act on the camera, an attitude detecting unit for detecting an attitude of the camera by detecting a gravitational acceleration direction, and an attitude calculating unit for calculating a coordinate transform matrix between a camera coordinate system and a static coordinate system from the attitude of the camera and from the angular velocities about the tri-axes. The image correcting camera also comprises a gravitational acceleration component calculating unit for calculating a gravitational acceleration component in the camera coordinate system by use of the coordinate transform matrix, a velocity calculating unit for calculating a velocity from an acceleration for a period from a first peak value point to a last peak value point in the predetermined time interval among accelerations with an elimination of the gravitational acceleration component by using this acceleration, and by assuming that a displacement of the camera at the first peak value point and a displacement thereof at the last peak value point are equal, and a displacement calculating unit for calculating a displacement during the correction of the image shake from the velocity calculated by the velocity calculating unit, an object distance measuring unit for measuring a distance between the camera and an object, a photographing magnification detecting unit for detecting a photographing magnification of the camera, a correction drive quantity calculating unit for calculating an image shake quantity on the basis of the displacements in X- and Y-axis directions, angles of rotations about X- and Y-axes that are calculated from the angular velocities about the X- and Y-axes, a distance between the camera and the object, and the photographing magnification, and for calculating a drive quantity of the correction lens and/or the imaging surface to offset the image shake quantity, an d a correction driving unit for moving the correction lens and/or the imaging surface.

According to the invention o f the present application, an image correcting camera comprises an acceleration detecting unit for detecting accelerations acting upon the camera in tri-axis directions, an angular velocity detecting unit for detecting angular velocities about tri-axes that act on the camera, an attitude detecting unit for detecting an attitude of the camera by detecting a gravitational acceleration direction, and an attitude calculating unit for calculating a coordinate transform matrix between a camera coordinate system and a static coordinate system from an initial attitude of the camera with respect to the static coordinate system and from the angular velocities about the tri-axes. The image correcting camera also comprises a gravitational acceleration component calculating unit for calculating a gravitational acceleration component in the camera coordinate system by use of the coordinate transform matrix, a velocity calculating unit for calculating a velocity from an acceleration for a period from a first peak value point to a last peak value point in the predetermined time interval among accelerations with an elimination of the gravitational acceleration component by using this acceleration, and by assuming that a displacement of the camera at the first peak value point and a displacement thereof at the last peak value point are equal, and a displacement calculating unit for calculating a displacement during the correction of the image shake from the velocity calculated by the velocity calculating unit, an object distance measuring unit for measuring a distance between the camera and an object, a photographing magnification detecting unit for detecting a photographing magnification of the camera, a correction drive quantity calculating unit for calculating an image shake quantity and a defocus quantity on the basis of the displacements in the tri-axis directions, angles of rotations about tri-axes that are calculated from the angular velocities about the tri-axes, a distance between the camera and the object, and the photographing magnification, and for calculating drive quantities of the correction lens and/or the imaging surface and the focusing lens to offset the image shake quantity and the defocus quantity, and a correction driving unit for moving the correction lens and/or the imaging surface and the focusing lens.

According to the invention of the present application, in the image correcting camera, the attitude calculating unit calculates the initial attitude of the camera with respect to the static coordinate system from a gravitational acceleration direction in the camera coordinate system that is obtained from the accelerations in the tri-axis directions.

According to the invention of the present application, in the image correcting camera, the acceleration detecting unit calculates the velocity from the acceleration till a full-push switch is turned ON after a half-push switch has been turned ON.

According to the invention of the present application, in the image correcting camera, the velocity calculating unit, when the acceleration detecting unit detects an acceleration with one or more periods, calculates the velocity, and the photographic process is executed without correcting the image shake, or the photographic process is stopped when the acceleration detecting unit does not detect the acceleration with one or more periods.

According to the invention of the present application, in the image correcting camera, the velocity calculating unit, when the acceleration detecting unit detects an acceleration over the predetermined time interval, calculates the velocity, and the photographic process is executed without correcting the image shake, or the photographic process is stopped when the acceleration detecting unit does not detect the acceleration over the predetermined time interval.

DESCRIPTION OF THE PREFERRED EMBODIMENTS

Figure 19:
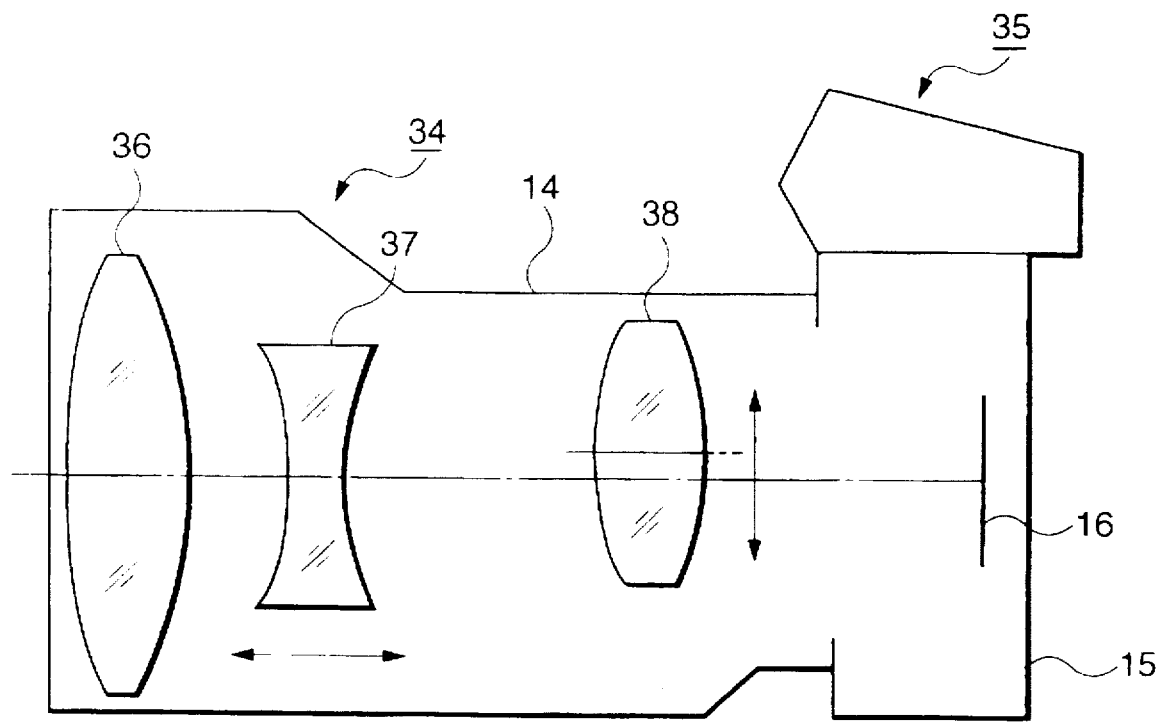
FIG. 19 is a view schematically showing a construction of a correction optical device of the conventional image correcting camera.

One embodiment of the present invention will be described with reference to the accompanying drawings. Note that a preventive optical device of an image correcting camera according to the present invention is the same as the device illustrated in FIG. 19.

Figure 1:
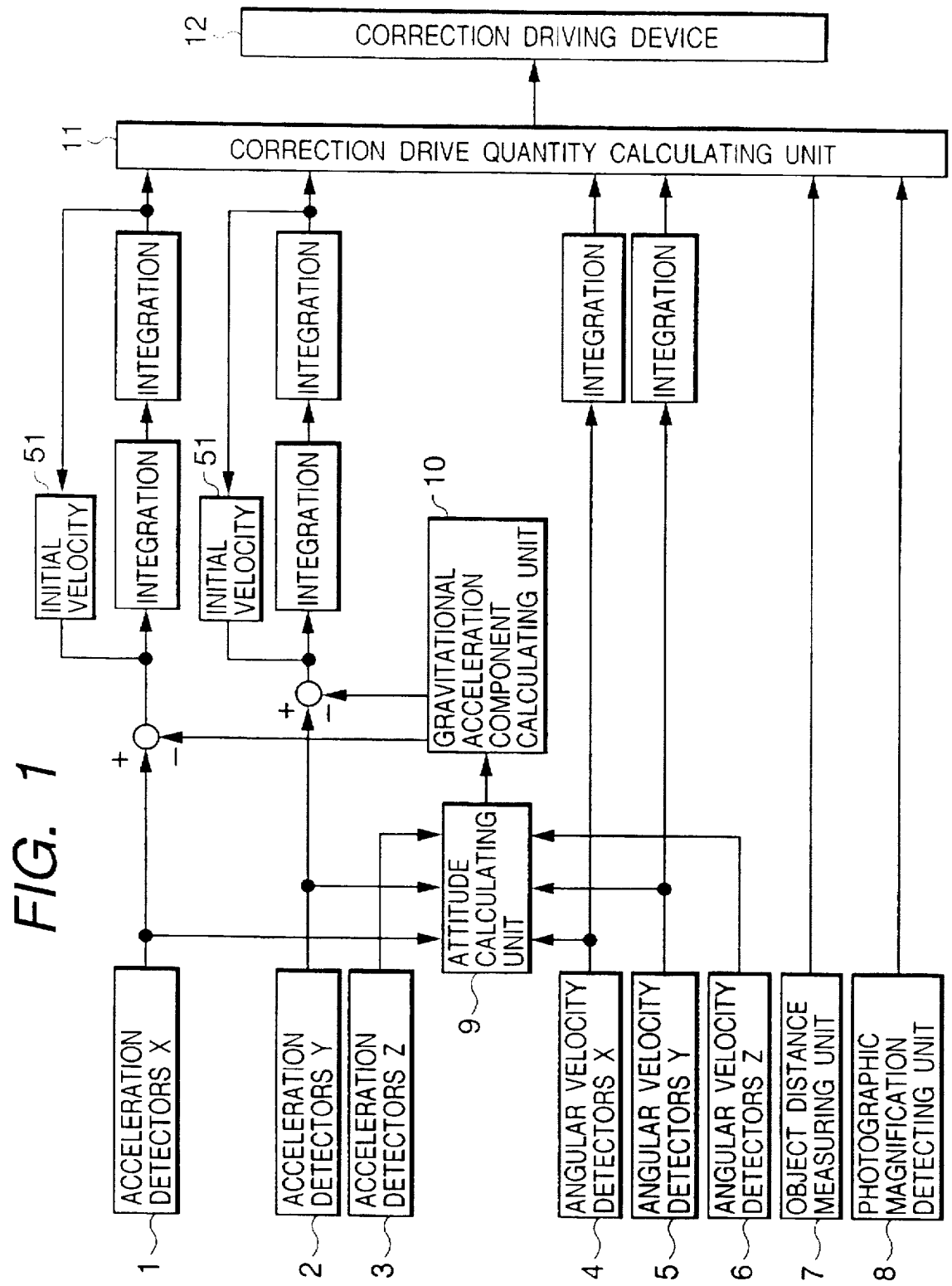
FIG. 1 is a block diagram showing a first embodiment of an image correcting camera according to the present invention.
Figure 2A:
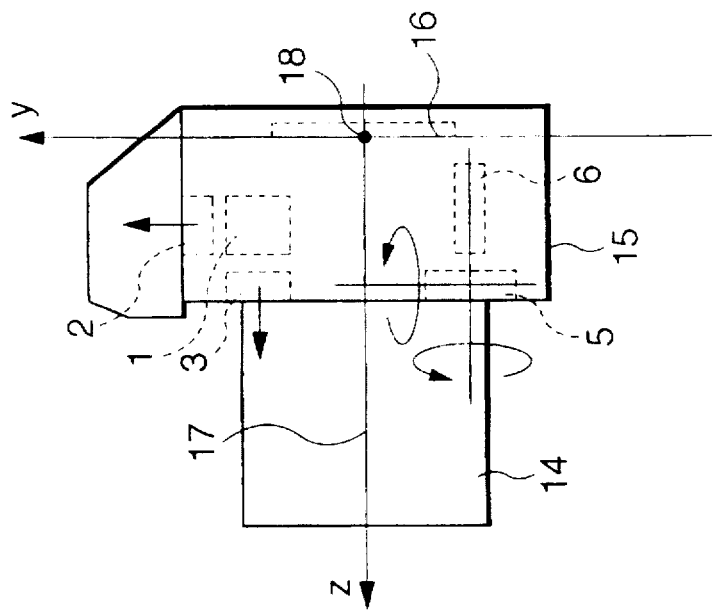
FIGS. 2A and 2B are a front view and a side view showing one embodiment of a position where acceleration detectors 1, 2, 3 and angular velocity detectors 4, 5, 6 are incorporated.
Figure 2B:
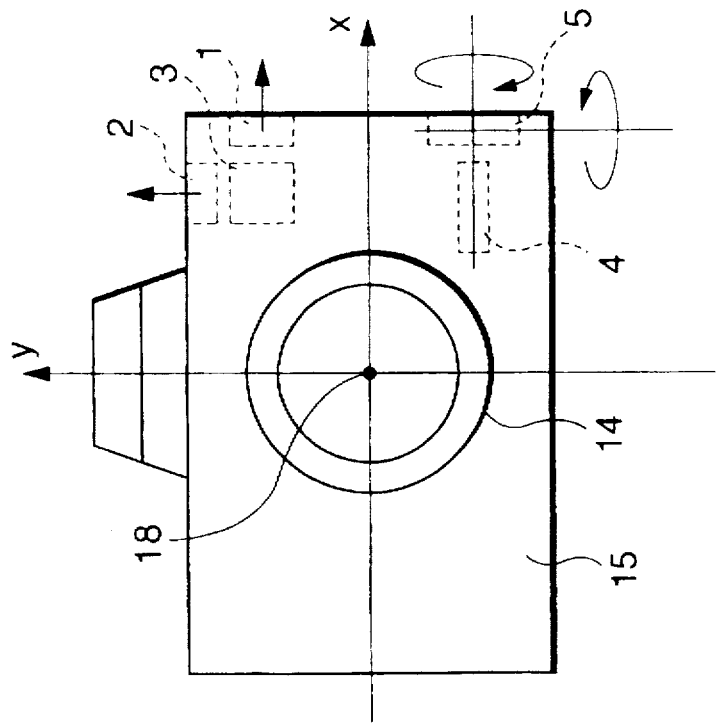

FIG. 1 is a block diagram showing the image correcting camera in a first embodiment of the present invention. This image correcting camera incorporates acceleration detectors 1, 2, 3, and angular velocity detectors 4, 5, 6. FIGS. 2A and 2B are views illustrating one embodiment in which to show positions of incorporating the acceleration detectors 1, 2, 3 and the angular velocity detectors 4, 5, 6. The acceleration detectors 1, 2, 3 and the angular velocity detectors 4, 5, 6 are attached within a camera body 15 and respectively detect accelerations in triaxial directions and angular velocities around tri-axes.

In accordance with this embodiment, an intersection of an optical axis 17 of a camera lens 14 upon a film surface 16 is defined as an origin 18 of rectangular coordinates; the optical axis 17 of the camera lens 14 is expressed as a Z-axis; and the film surface 16 is expressed as an X-Y plane.

Output values of the acceleration detectors 1, 2, 3 contain an acceleration generated by translational vibrations and a gravitational acceleration. Further, an attitude of the camera changes due to a rotational vibration of the camera, and hence there changes an angle made by a gravitational acceleration direction and a detection axis direction of the acceleration detectors 1, 2, 3 that are fixed to a camera coordinate system. Therefore, the gravitational acceleration component is removed from the output values of the acceleration detectors 1, 2, 3, and a displacement is thus calculated by use of only the acceleration components generated by the translational vibrations.

For calculating the gravitational acceleration component, the image correcting camera includes an attitude calculating unit 9 and a gravitational acceleration component calculating unit 10.

Figure 3:
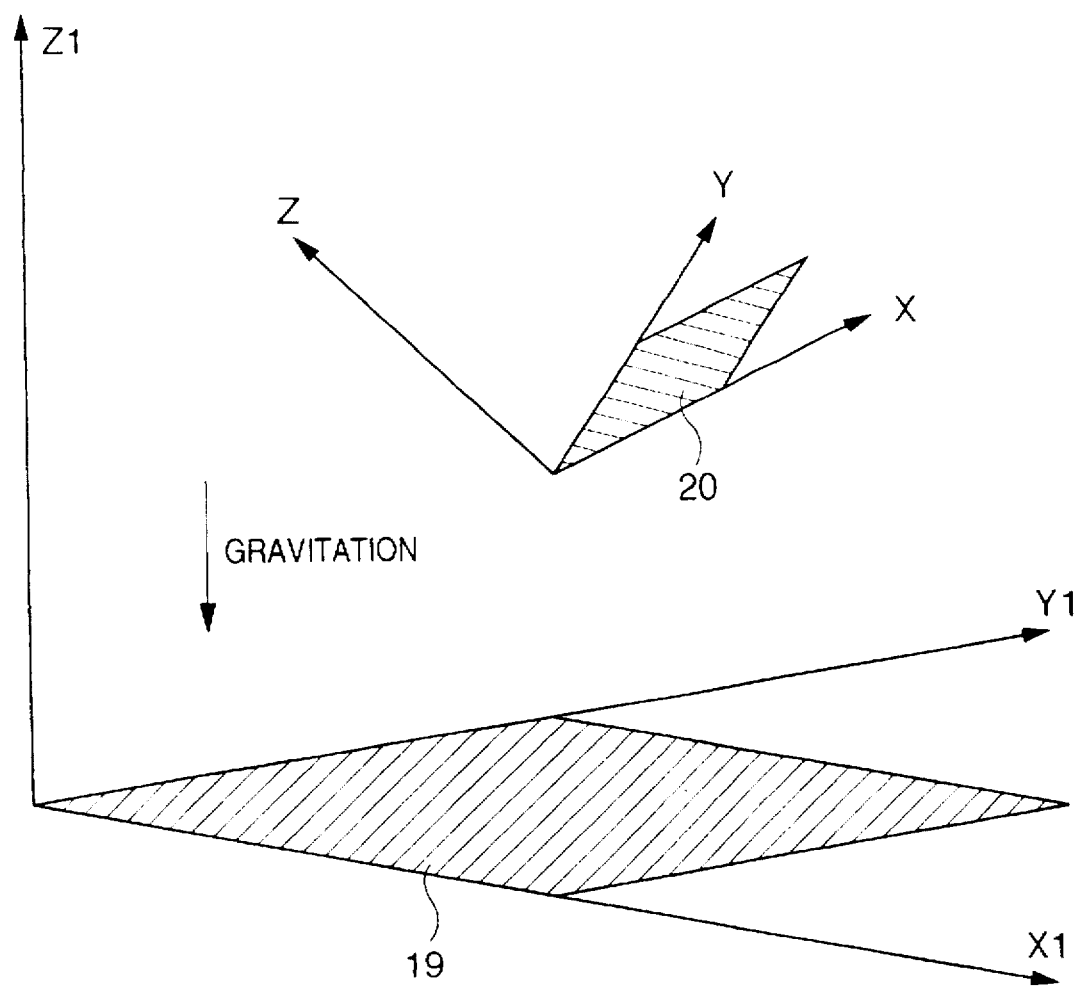
FIG. 3 is a diagram illustrating an inertial coordinate system 19 defined as a static coordinate system, and a camera coordinate system 20 defined as a kinetic coordinate system.

The attitude calculating unit 9 calculates a coordinate transform matrix T for a transform from, as shown in FIG. 3, an inertial coordinate system 19 defined as a static coordinate system into a camera coordinate system 20 defined as a kinetic coordinate system. This coordinate transform matrix T is calculated by using the initial attitude of the camera and the angular velocities about the tri-axes that are defined as outputs of the angular velocity detectors 4, 5, 6. This calculation method is a method employed for an inertial navigation system, etc. of a strap down system, and details thereof are disclosed in, e.g., Japanese Patent Laid-Open Application No. 2-309702.

First of all, the initial attitude of the camera is obtained by making use of the gravitational acceleration direction obtained from the outputs of the acceleration detectors 1, 2, 3. Herein, the rotational vibration and the translational vibration are incidental to the camera, and therefore the gravitational acceleration direction continues to be measured for a proper period of time. Then, an average gravitational acceleration direction is obtained by calculating an average of the measured results. Thus, the average attitude of the camera with respect to the inertial coordinate system is obtained from the gravitational acceleration direction in the camera coordinate system, and set to the initial attitude of the camera.

A formula (1) is a differential equation for calculating the coordinate transform matrix T. Angular velocities $\omega_x$, $\omega_y$, $\omega_z$ about the X-, Y- and Z-axes that are defined as outputs of the angular velocity detectors 4, 5, 6 are substituted into the formula (1), thereby obtaining $\Omega_c$. Then, the coordinate transform matrix T is calculated by solving the differential equation, wherein the initial attitude of the camera is set as an initial condition.

$$\hat{T} = \Omega_C \cdot T \tag{1}$$

where $$\Omega_C = \begin{vmatrix} 0 & \omega_Z & -\omega_Y \\ -\omega_Z & 0 & \omega_X \\ \omega_Y & -\omega_X & 0 \end{vmatrix}$$

The gravitational acceleration component calculating unit 10 serves to obtain a gravitational acceleration component in the camera coordinates by multiplying the gravitational acceleration component in the inertial coordinate system by the coordinate transform matrix T. An acceleration generated by the translational vibrations is obtained by eliminating this gravitational acceleration component from the X- and Y-axis directional accelerations conceived as the output values of the acceleration detectors 1, 2. Further, displacements of the translational vibrations in the X- and Y-axis directions are calculated by integrating this value. On the other hand, angles of rotations about the X- and Y-axes are calculated by integrating the angular velocity about the X- and Y-axes that are conceived as output values of the angular velocity detectors 4, 5.

Given herein are explanations of a case where the acceleration is calculated by eliminating the gravitational acceleration component and of a case where the acceleration is calculated by eliminating no gravitational acceleration component.

Figure 4A:
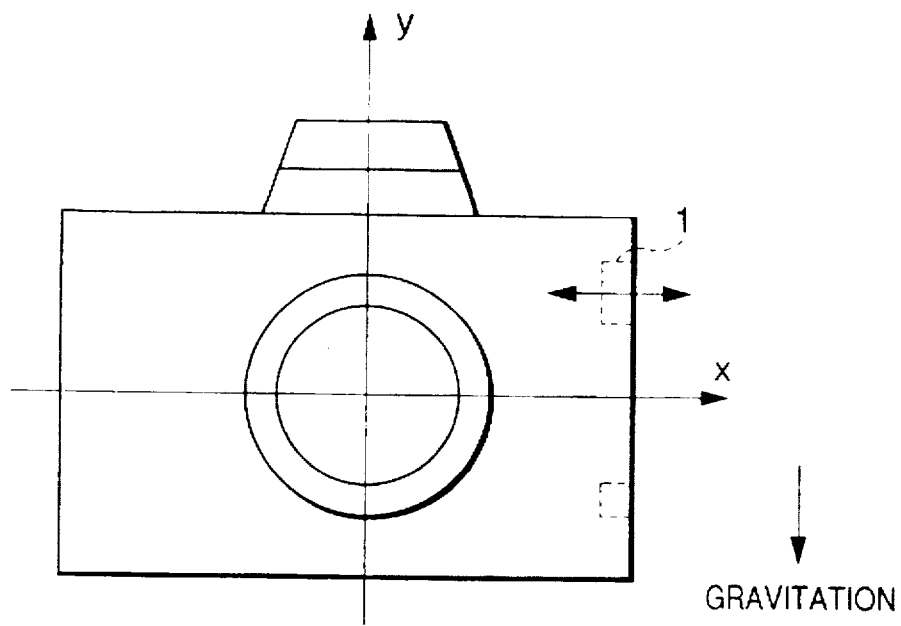
FIGS. 4A and 4B are views showing directions of vibrations produced in the camera.
Figure 4B:
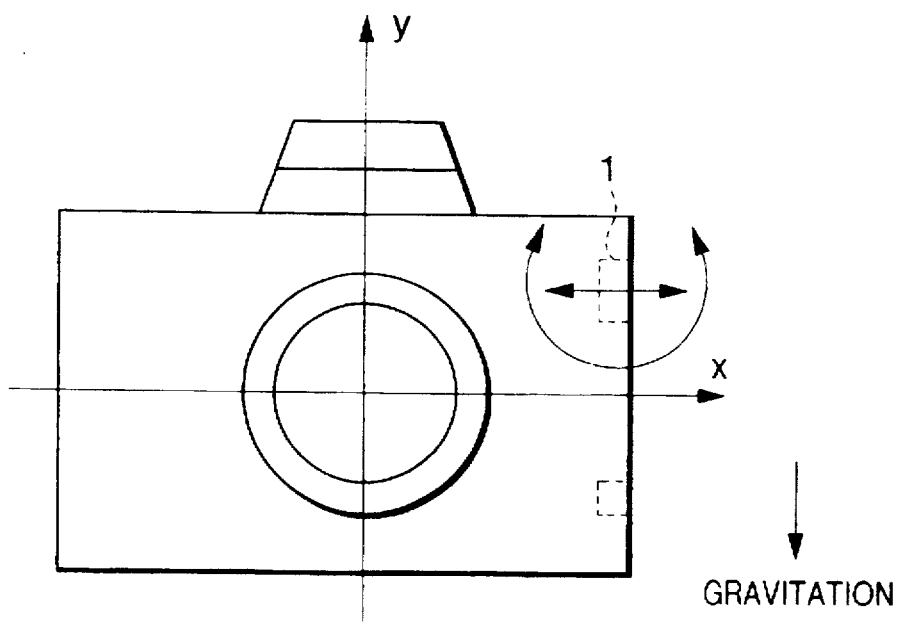

FIGS. 4A and 4B are views showing (presumed) directions of the vibrations caused in the camera.

FIG. 4A shows an example in which the translational vibrations occur in the detection axis direction of the acceleration detector 1, i.e., in the X-axis direction. FIG. 4B illustrates an example in which the rotational vibrations about the Z-axis occur with respect to the acceleration detector 1 in addition to the translational vibrations shown in FIG. 4A.

Figure 5:
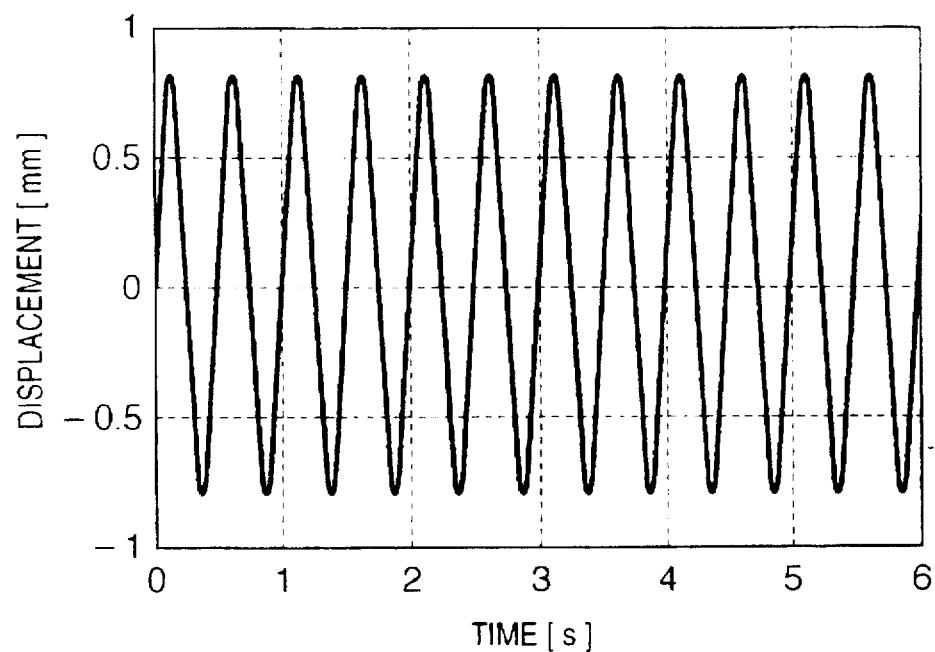
FIG. 5 is a graph showing a displacement of a translational vibration.
Figure 6:
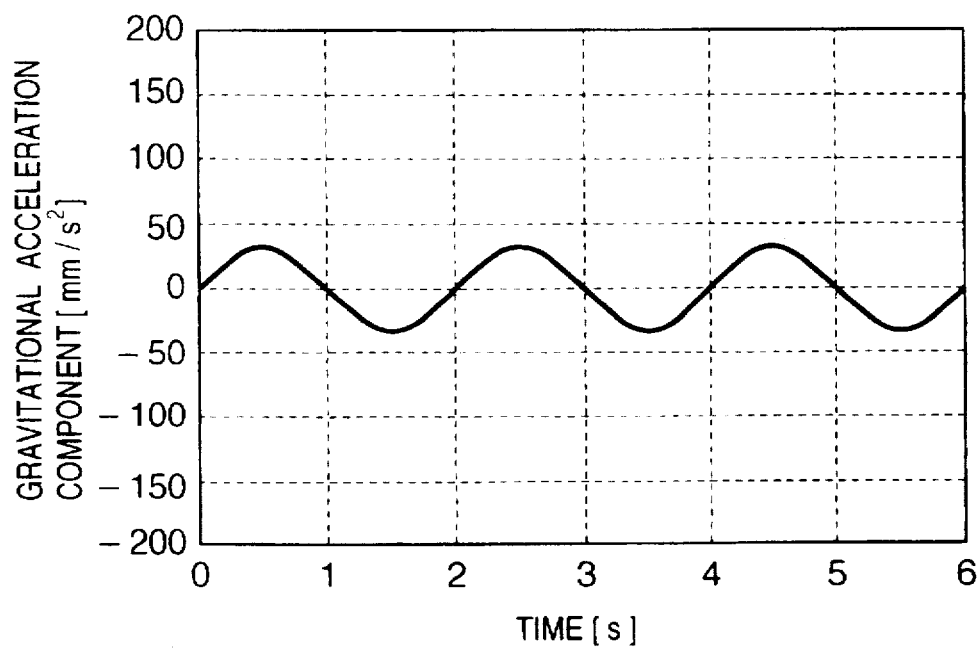
FIG. 6 is a graph showing a gravitational acceleration component in a detection-axis (an X-axis) direction of the acceleration detector 1 that is produced by rotational vibrations.

FIGS. 5 and 6 are graphs respectively showing the displacement of the translational vibration at that moment and showing the gravitational acceleration component in the detection axis (X-axis) direction of the acceleration detector 1, which component is generated by the rotational vibrations. Herein, for simplifying the explanation, the translational vibration and the rotational vibration take sine wave forms, wherein amplitudes and frequencies thereof are 0.8 mm, 2.0 Hz, 0.2 deg, and 0.5 Hz. Further, a gravitational direction at this time is set downward.

Figure 7:
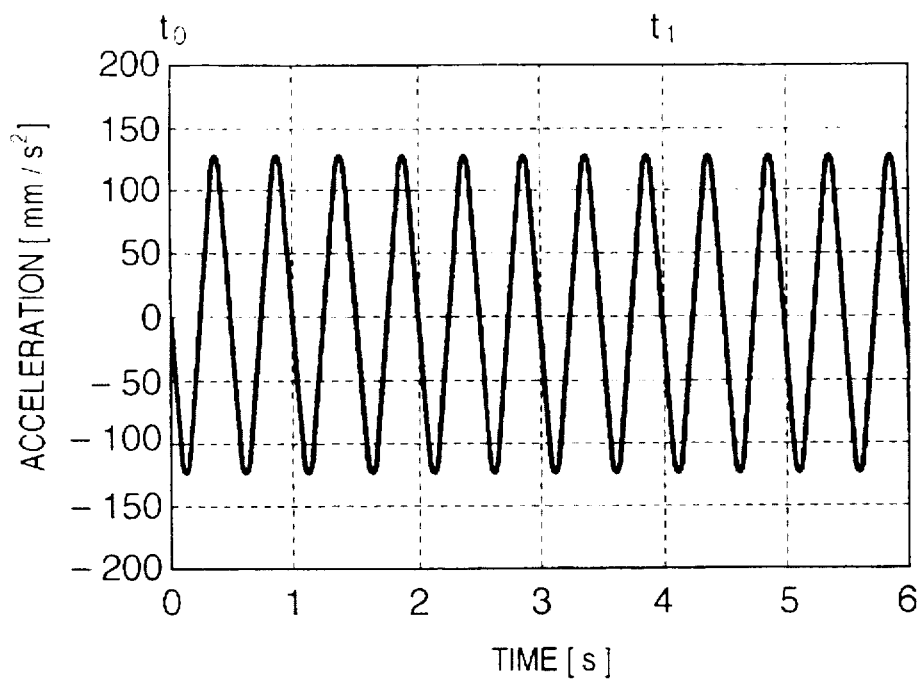
FIG. 7 is a graph showing an output of the acceleration detector 1.

Referring to FIG. 4A, the X-axis in the camera coordinate system remains orthogonal to the gravitational direction, and the angle made by the X-axis and the gravitational direction remains unchanged. Hence, the gravitational acceleration component acting upon the detection axis of the acceleration detector 1 does not change and is therefore 0. Accordingly, the acceleration acting upon the detection axis of the acceleration detector 1 is only an acceleration generated by the translational vibrations. FIG. 7 is a graph showing an output of the acceleration detector 1 at that time.

Next, a method of calculating an initial velocity is explained.

Figure 8:
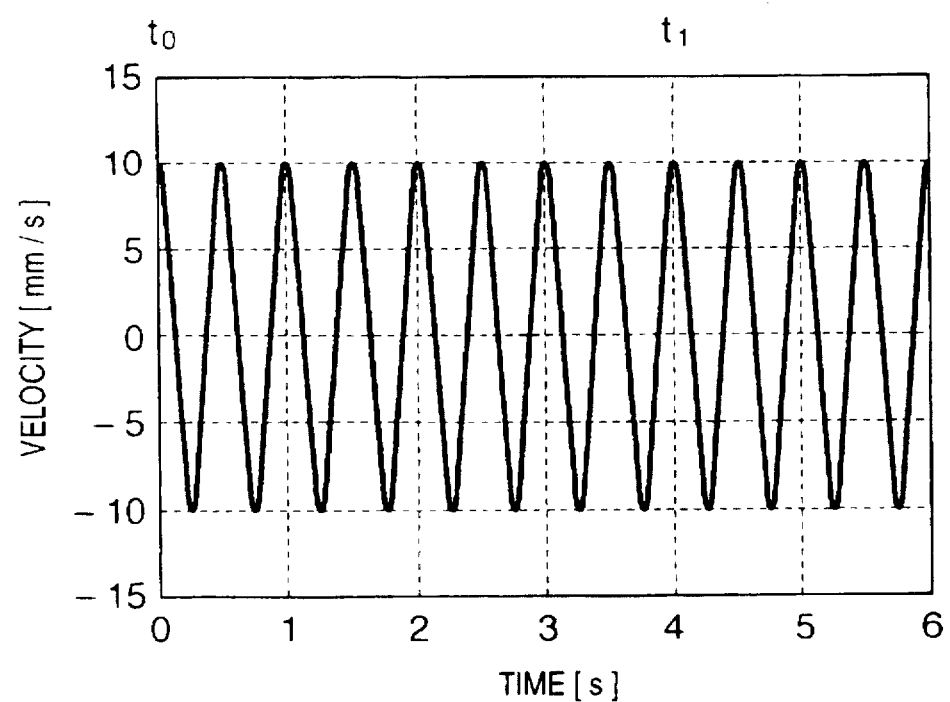
FIG. 8 is a graph showing a velocity.

For instance, when starting an exposure of the camera at a timing t1 (4S) in FIG. 7, it is required that the initial velocity at t1 be calculated in order to calculate a translational displacement after t1 onward. In this case, an acceleration from a timing t0 (e.g., 0S) that is a predetermined time anterior to t1 up to the timing t1, is integrated; and an initial velocity V0 at t0 is calculated so that the thus integrated value, i.e., a velocity fluctuates on the basis of 0. FIG. 8 is a graph showing the velocity at that time. The initial velocity at t1, which is to be sought, can be obtained.

Figure 9:
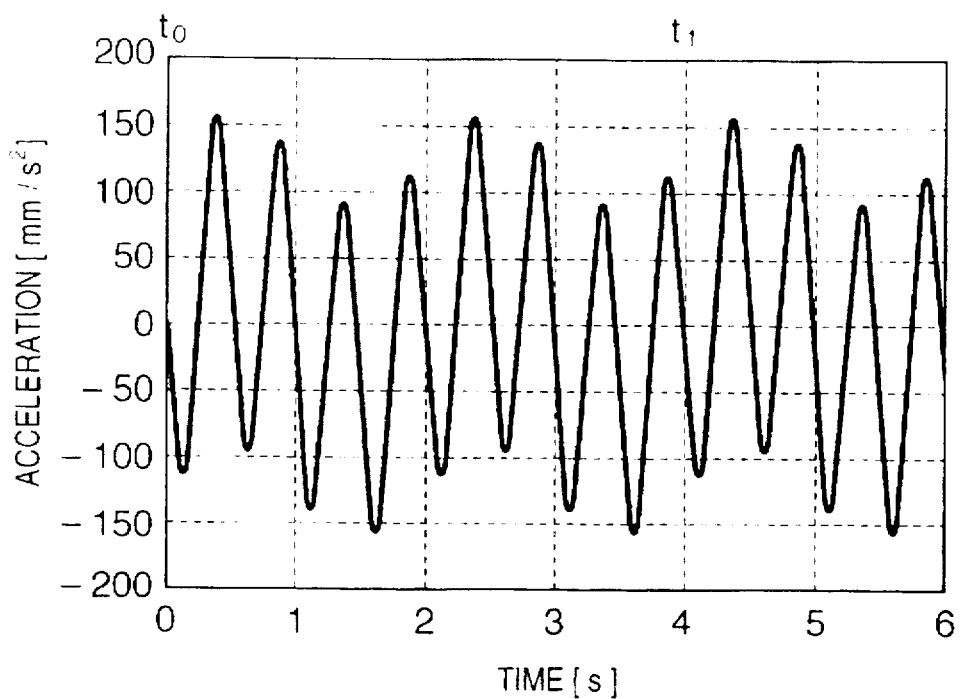
FIG. 9 is a graph showing an acceleration output (before eliminating the gravitational acceleration component) of the acceleration detector 1.
Figure 10:
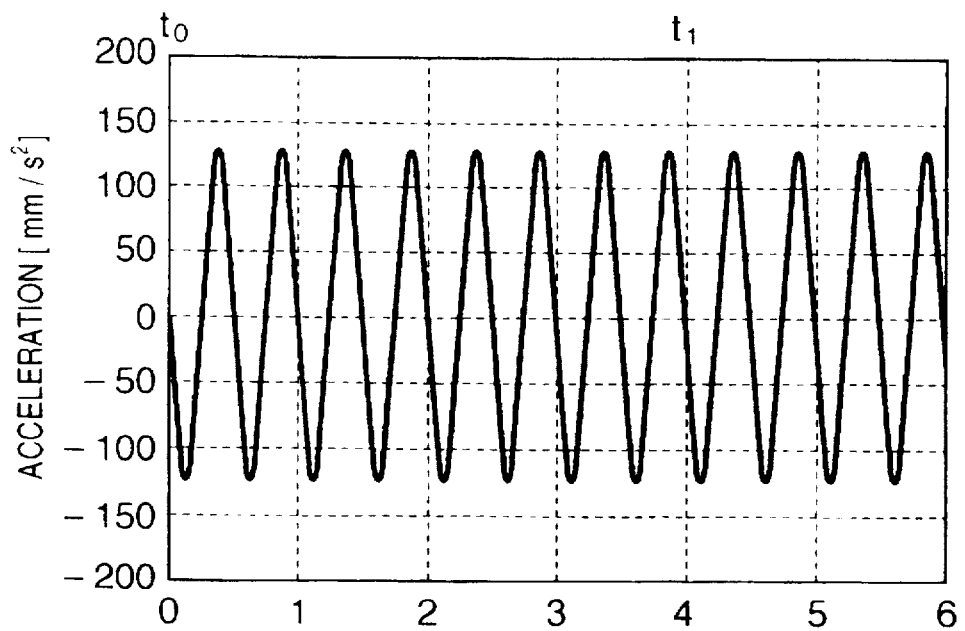
FIG. 10 is a graph showing an acceleration after eliminating the gravitational acceleration component.
Figure 11:
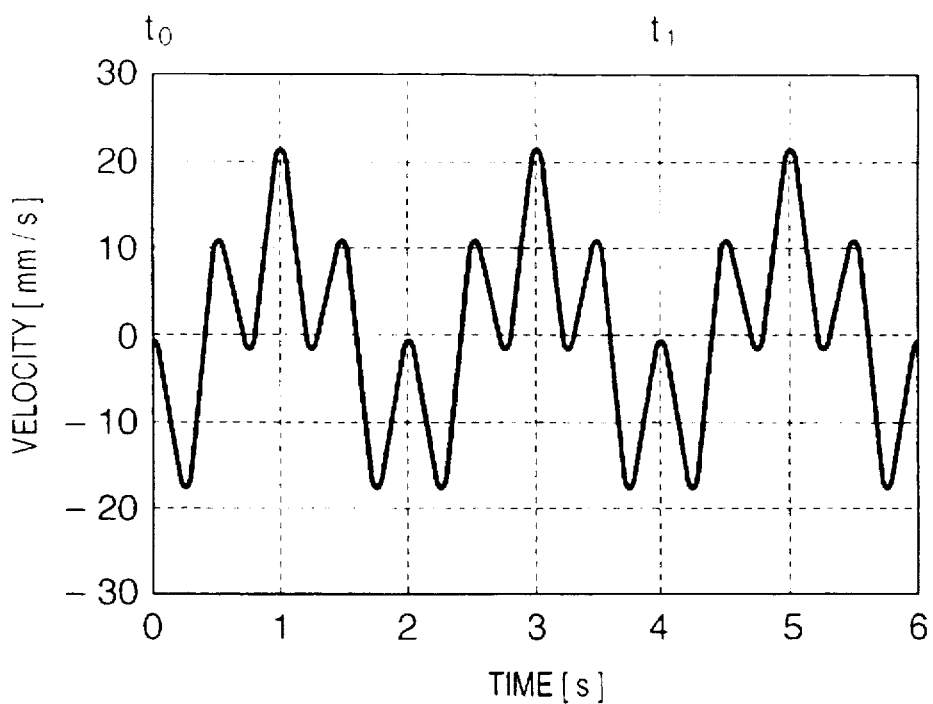
FIG. 11 is a graph showing a velocity obtained from the acceleration before eliminating the gravitational acceleration component.
Figure 12:
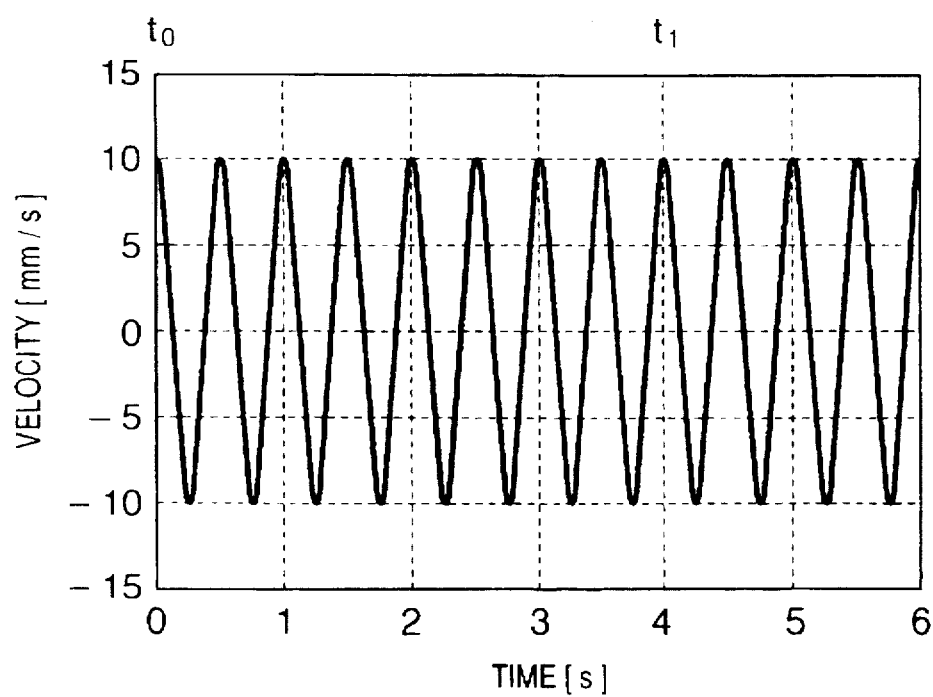
FIG. 12 is a graph showing a velocity obtained from the acceleration after eliminating the gravitational acceleration.

The same calculation is applied to the case shown in FIG. 4B. Referring to FIG. 4B, the angle made by the X-axis in the camera coordinate system and the gravitational direction. Accordingly, the acceleration acting upon the detection axis of the acceleration detector 1 is an acceleration obtained by making the acceleration generated by the translational vibrations contain the gravitational acceleration component acting on the detection axis of the acceleration detector 1. FIGS. 9 and 10 are graphs each showing an acceleration output of the acceleration detector 1 at that time but respectively showing those before and after eliminating the gravitational acceleration component. Executed then is an arithmetic operation for obtaining the initial velocity at t1 with respect to the accelerations shown in FIGS. 9 and 10. FIGS. 11 and 12 are graphs each, showing the velocity obtained.

Figure 13:
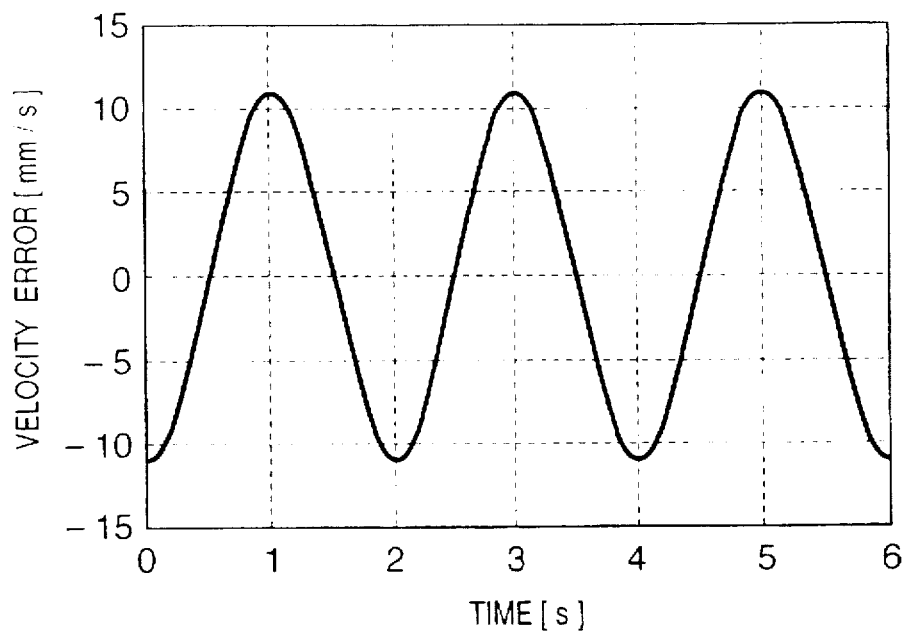
FIG. 13 is a graph showing a velocity error when the gravitational acceleration component is not eliminated.

The translational vibrations in FIG. 4B are the same as the translational vibrations in FIG. 4A, and hence the acceleration and the velocity that are generated by the translational vibrations are equal to those shown in FIGS. 7 and 8. Accordingly, it can be understood that if the gravitational acceleration component is eliminated, the precise acceleration and velocity can be obtained, whereas if not eliminated, however, the precise acceleration and velocity can not be obtained. FIG. 13 is a graph showing a velocity error in the case of not eliminating the gravitational acceleration component.

Obtaining a translational displacement based on the above-mentioned may involve simply integrating the acceleration output after eliminating the gravitational acceleration component after t1, wherein the integration of the initial velocity at t1 is set as an initial condition. Herein, the translational displacement needed for obtaining an image shake quantity may be a relative displacement, and therefore, when calculating the displacement by integrating the velocity, an integration constant is not required.

As discussed above, the acceleration generated by the translational vibrations and the initial velocity thereat can be precisely calculated by eliminating the gravitational acceleration component, and the translational vibrations can be detected with a high accuracy.

An object distance measuring unit 7 measures a distance to the object on the basis of a moving quantity of a focusing lens when focalized by use of a lens having an encoder.

A photographing magnification detecting unit 8 detects a magnification when photographed by the camera.

Figure 14A:
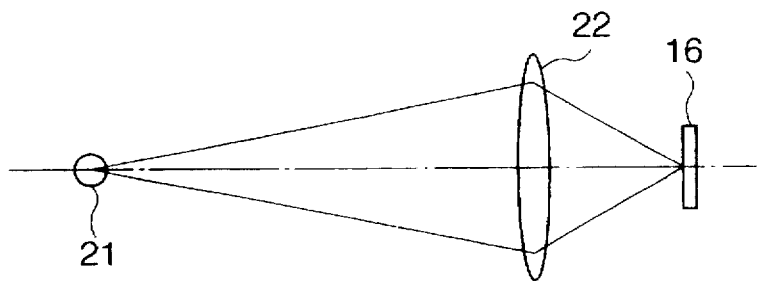
FIGS. 14A and 14B are views showing an image shake on a film surface 16.
Figure 14B:
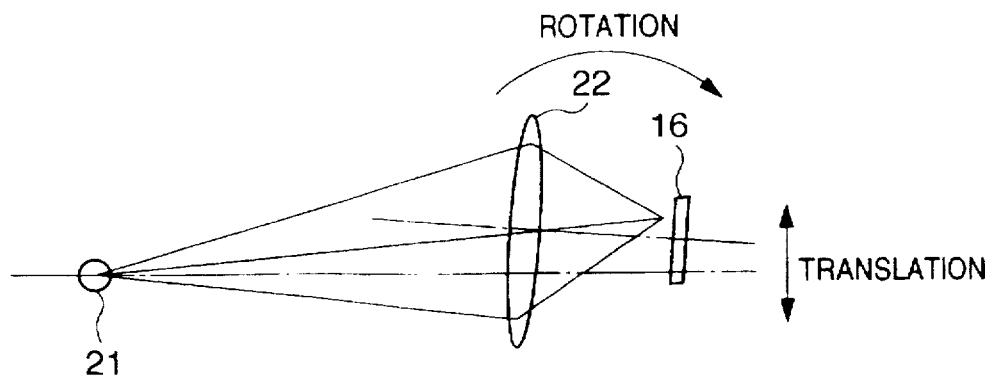

A correction moving quantity calculating unit 11 calculates a drive quantity of a correction lens 38 (FIG. 19) for correcting the image shake. The correction drive quantity calculating unit 11 obtains a motion of the camera which influences the image shake from the displacement of the translational vibrations in the X- and Y-axis directions and the angles of the rotations about the X- and Y-axes that are calculated as stated above. Further, the correction drive quantity calculating unit 11 obtains two-dimensional image shake quantities on the film surface 16 as illustrated in FIGS. 14A and 14B in accordance with the distance to the object and the photographic magnification. Calculated next are signals for moving the correction lens 38 so as to offset the image shake by use of signals thereof.

A correction driving device 12 moves the correction lens 38 in accordance with these signals. A known device as this correction driving device herein is disclosed in, e.g., Japanese Patent Laid-Open Application No. 5-158100.

In the manner described above, the correction lens 38 is moved by use of the signals into which the gravitational acceleration component is eliminated from the output values of the acceleration detectors 1, 2, whereby it is possible to correct the image shake without being influenced by the gravitational acceleration component and to thereby obtain a clear-cut image.

Figure 15:
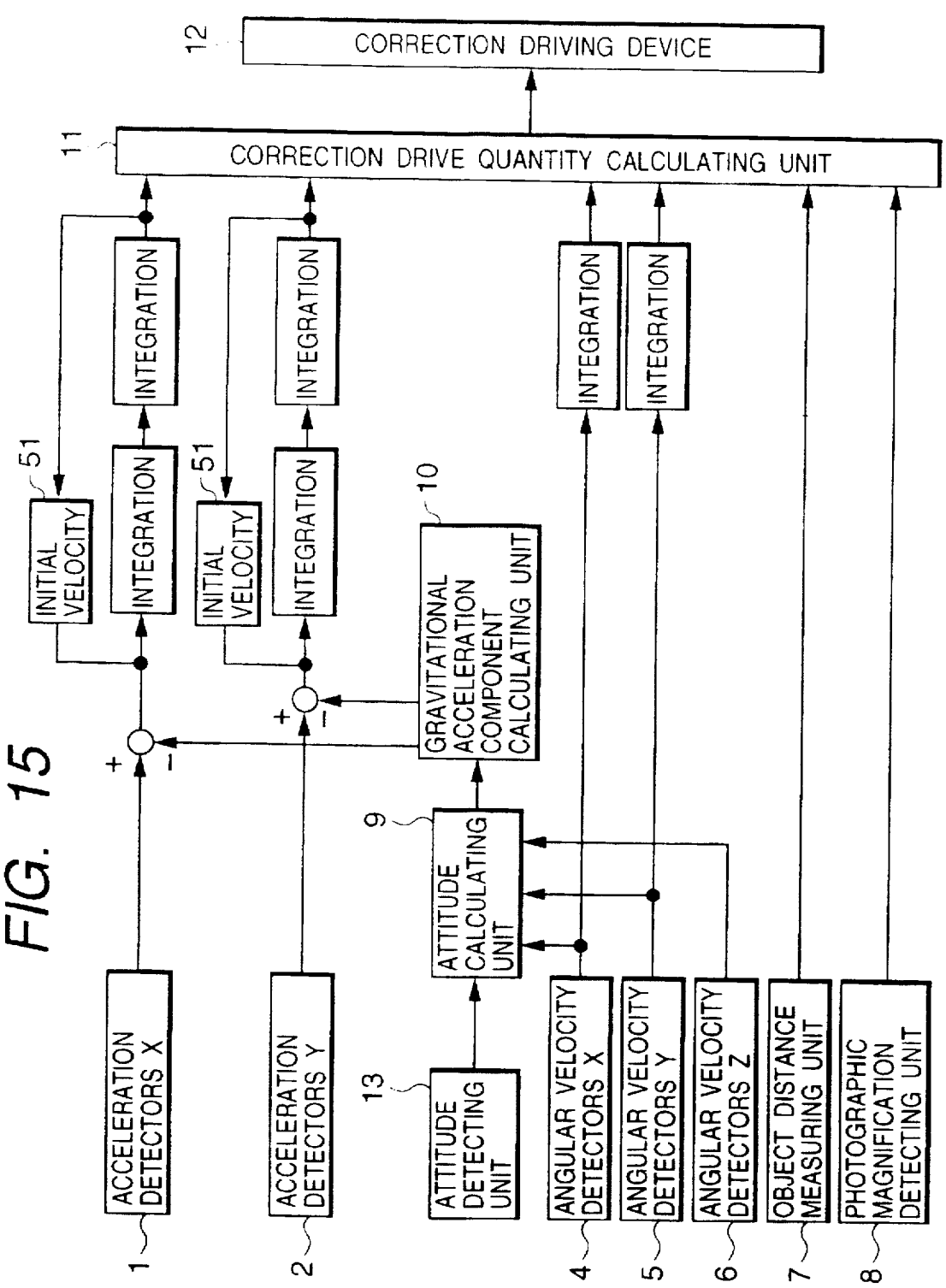
FIG. 15 is a block diagram illustrating a second embodiment of the image correcting camera according to the present invention.
Figure 16:
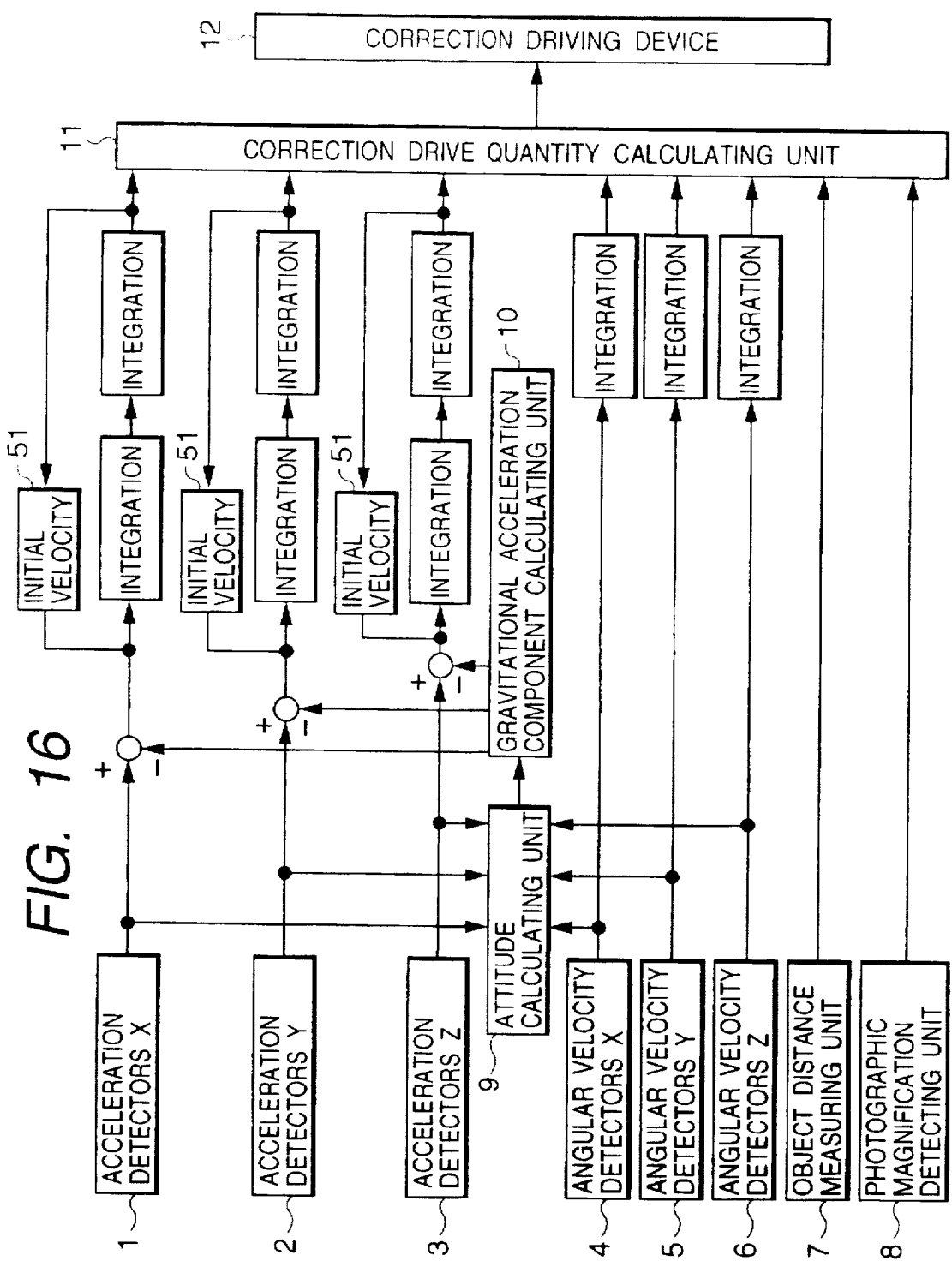
FIG. 16 is a block diagram illustrating a third embodiment of the image correcting camera of the present invention.
Figure 17:
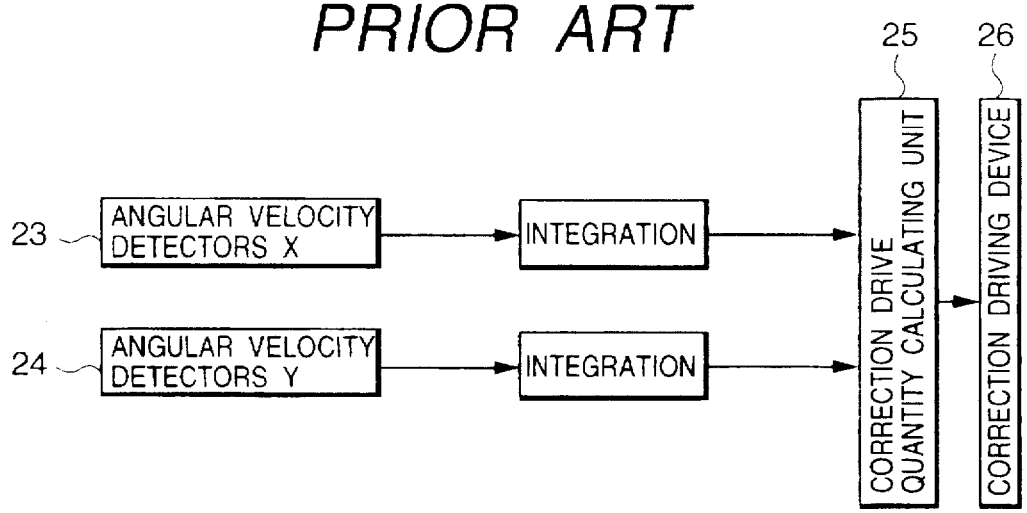
FIG. 17 is a block diagram showing a first example of a conventional image correcting camera.
Figure 18:
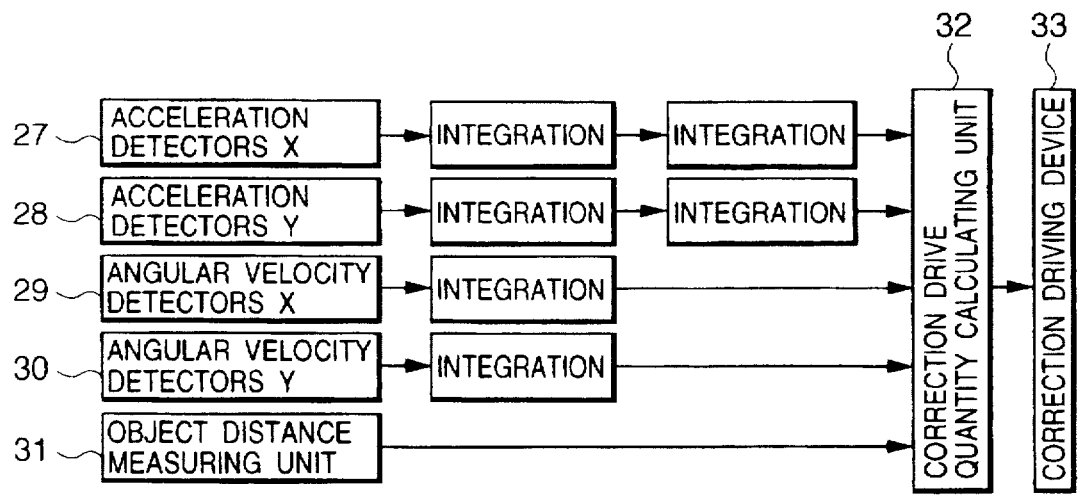
FIG. 18 is a block diagram showing a second example of the conventional image correcting camera.

FIGS. 15 and 16 are block diagrams illustrating second and third embodiments of the image correcting camera according to the present invention. Hereinafter, portions different from the image correcting camera in FIG. 1 will be explained.

FIG. 15 illustrates the image correcting camera provided with not the acceleration detector 3 but an attitude detecting unit 13. The attitude detecting unit 13 detects an attitude of the camera by detecting a direction of the gravitational acceleration. Accordingly, the attitude calculating unit 9 calculates the coordinate transform matrix T by use of an output of the attitude detecting unit 13 and outputs of the angular velocity detectors 4, 5, 6.

Note that the acceleration detectors 1, 2, 3 are, if unable to detect a static acceleration of a piezoelectric type, etc., incapable of detecting the gravitational acceleration direction, and it is therefore required that the attitude detecting unit 13 as shown in FIG. 15 be employed. In this case, the acceleration detector 3 for detecting the acceleration in the Z-axis direction becomes unnecessary.

Further, according to the camera shown in FIG. 1, the correction is made by obtaining the two-dimensional image shake quantities on the film surface 16 from the displacements of the translational vibrations in the X-and Y-axis directions and from the angles of rotations about the X- and Y-axes. According to the camera in FIG. 16, however, the correction is made by obtaining three-dimensional image shake quantities from a displacement of the translational vibration in the Z-axis direction and from an angle of rotation about the Z-axis.

Hence, the gravitational acceleration component calculated by the gravitational acceleration component calculating unit 10 is eliminated from the Z-axis directional acceleration defined as an output value of the acceleration detector 3, and further this value is integrated, thereby calculating a displacement of a Z-axis directional translational vibration. The thus calculated displacement is transferred to the correction drive quantity calculating unit 11.

Also, an angle of rotation about the Z-axis is calculated by integrating the angular velocity about the Z-axis that is defined as an output value of an angular velocity detector 6 and then transferred to the correction drive quantity calculating unit 11.

At this time, a method of correcting a defocus caused by the Z-axis directional translational vibration may include a method of moving, e.g., a focusing lens 37 (FIG. 19) in the Z-axis direction that is used for autofocusing. Further, a method of correcting the image shake due to a rotational vibration about the Z-axis may include a method of rotating, e.g., an imaging surface and a method of using an image rotator.

One embodiment of the present invention has been discussed so far. The present invention is not, however limited to the embodiment discussed above and can be modified in a variety of forms within the equal scope.

For instance, the acceleration detectors 1, 2, 3 and the angular velocity detectors 4, 5, 6 are attached inside the camera body 15 but may be incorporated into the camera lens 14. Furthermore, the acceleration detectors 1, 2, 3 may simply be capable of detecting the accelerations in the triaxial directions and may therefore be replaced by one three-dimensional acceleration detector.

In accordance with the embodiment, the image shake is corrected by moving the correction lens 38 but may be corrected by moving, e.g., a film. Moreover, in the case of a video camera, either the correction lens or an imaging device may be moved.

Also, referring to FIG. 1 or FIG. 16, the attitude calculating unit 9 obtains the initial attitude of the camera by making use of the gravitational acceleration direction in the camera coordinate system that is obtained from the outputs of the acceleration detectors 1, 2, 3. A method of obtaining the initial attitude of the camera is not, however, confined to this method. For example, the camera is set in a certain attitude (horizontally, vertically, etc.), the camera is made to recognize the attitude at this time by depressing a button and so forth, and this may also be set as an initial attitude of the camera.

According to the present invention, the initial velocity of the translational vibrations and the displacement are calculated by use of the acceleration outputs with the elimination of the gravitational acceleration component, and the image shake (the image shake and the defocus) is thus corrected. Hence, even if the gravitational acceleration component acting upon the detection axis of the acceleration detecting unit changes because of the rotational vibrations, it feasible to obtain the clear-cut image.

In the embodiment discussed above, it is required that the acceleration be integrated in order to obtain the velocity and the displacement from the acceleration. On the occasion of the integration, however, the integration constant, i.e., the initial condition, is needed. In particular, obtaining the velocity from the acceleration when correcting the image shake in the camera entails the initial velocity when stating the integration.

For calculating the translational displacement after (t1) when starting an exposure in the camera, the acceleration from the timing t0 that is the predetermined time anterior to t1 up to the timing t1, is integrated; and the initial velocity V0 at t0 is calculated so that the thus integrated value, i.e., the velocity, fluctuates on the basis of 0. The initial velocity at t1 can be obtained by use of this result. According to this method, an accuracy for calculating the velocity varies depending on a value of the predetermined time (t1−t0), and it might happen that the predetermined time (t1−t0) becomes 10 seconds or longer in order to enhance the accuracy.

A calculation method employed hitherto is that the integration is started by setting a static state as an initial state, and the velocity is set to 0. When this method is used for correcting the image shake in the camera, it is required that the integration be started in a state in which the camera is rendered static, and there arises a problem in which it is inconvenient or hard to attain the static state.

Further, if a time from the static state to photographing elongates, an error in terms of the displacement obtained during the photography increases due to an accumulation of integration errors caused during the integration executed meanwhile. Also, there is a necessity for continuing the integrating calculation by making an ever-detection of the accelerations for a long period of time from the static state to the photographing, and hence a large amount of electric power is needed for operating the acceleration detectors and the calculating unit as well. This might be a problem especially for the camera using a battery cell. Moreover, if the integrating calculation is once interrupted during the period from the static state to the photographing, a problem is also caused, wherein the camera is required to be set again in the static state.

An embodiment which follows aims at obtaining a clear-cut image by accurately detecting the translational vibrations of the camera, seeking the initial velocity at a high efficiency, and thereby precisely correcting the image shake. This embodiment will hereinafter be discussed with reference to the drawings.

FIG. 8 is a graph showing a velocity obtained by integrating the acceleration shown in FIG. 7. Herein, a method of calculating the velocity by integrating the acceleration and at the same time determining the initial velocity, will be explained later.

Referring to FIG. 4B, the angle made by the X-axis in the camera coordinate system and by the gravitational direction changes. Accordingly, the acceleration acting upon the detection axis of the acceleration detector 1 is an acceleration obtained by making the acceleration generated by the translational vibrations contain the gravitational acceleration component acting on the detection axis of the acceleration detector 1. FIGS. 9 and 10 are graphs each showing an acceleration output of the acceleration detector 1 at that time but respectively showing those before and after eliminating the gravitational acceleration component. Further, FIGS. 11 and 12 are graphs showing velocities obtained by integrating the accelerations shown in FIGS. 9 and 10.

It is the same as the above-mentioned that the acceleration produced by the translational vibrations can be precisely calculated by eliminating the gravitational acceleration component, and the translational vibrations can be detected with the high accuracy.

Next, the method of calculating the initial velocity will be explained. The initial velocity can not be theoretically obtained. The outputs of the acceleration detectors 1, 2, 3 are, however, related to the camera shake, and hence it shall be understood that the initial velocity is obtained on the assumption of periodic motions effected in terms of a characteristic thereof. According to the present invention, as illustrated in the block diagram of FIG. 1, the acceleration is at first integrated, and the velocity is obtained while the initial velocity remains undetermined, and this is further integrated, thereby obtaining a displacement. Thereafter, an initial velocity calculating unit 51 calculates the velocity by determining the initial velocity.

Figure 20A:
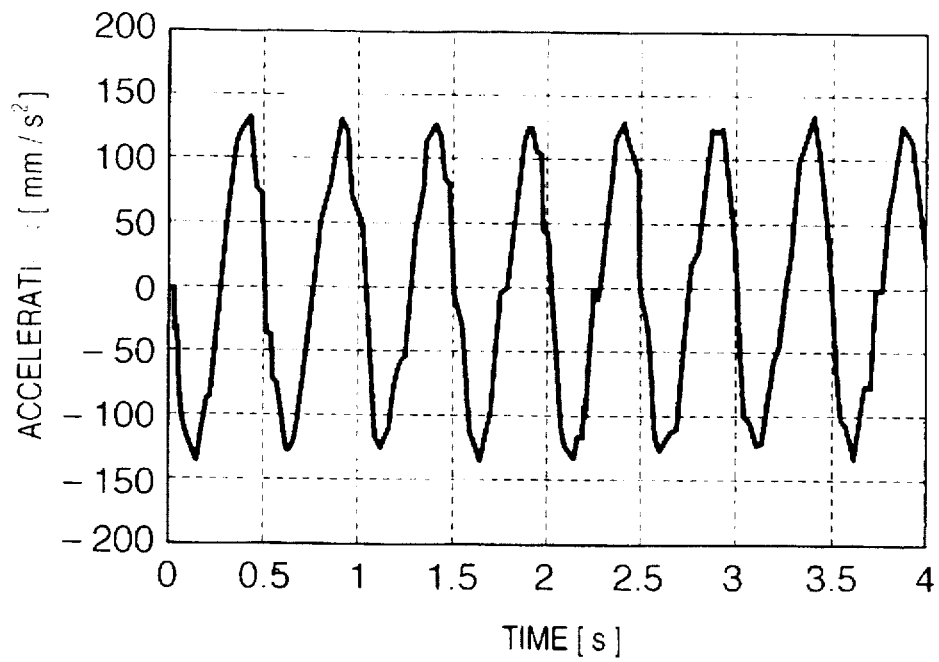
FIGS. 20A and 20B are graphs each showing an output of the acceleration detector 1.
Figure 20B:
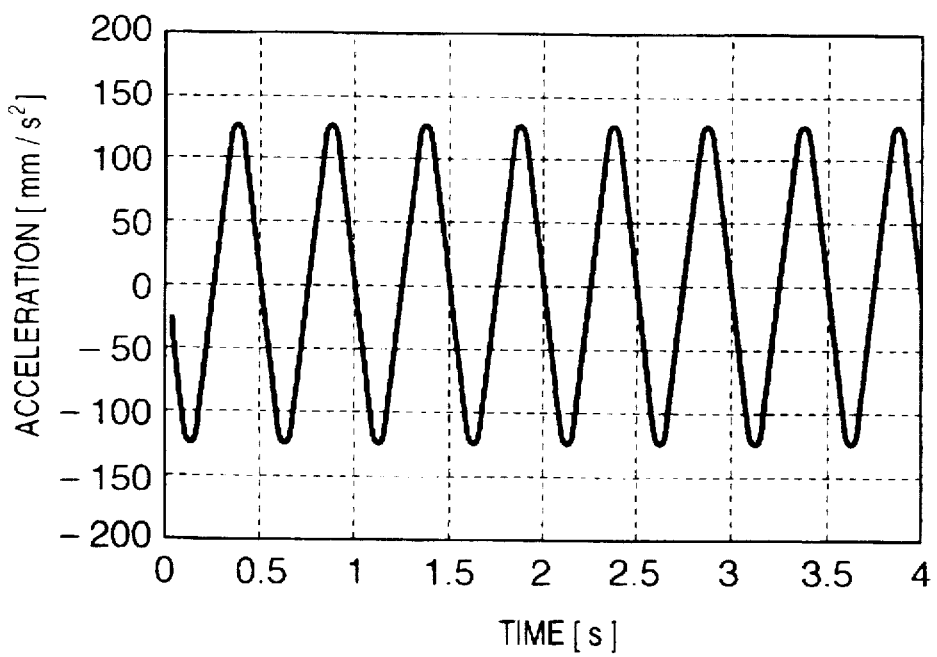

FIGS. 20A and 20B are graphs each showing the output of the acceleration detector 1. This acceleration is, as described above, an acceleration into which the gravitational acceleration component has already been eliminated. The output value contains noises as shown in FIG. 20A, and therefore the noises are removed by employing a low-pass filter, a high-pass filter and a movement average, whereby the acceleration is set as shown in FIG. 20B.

Figure 21:
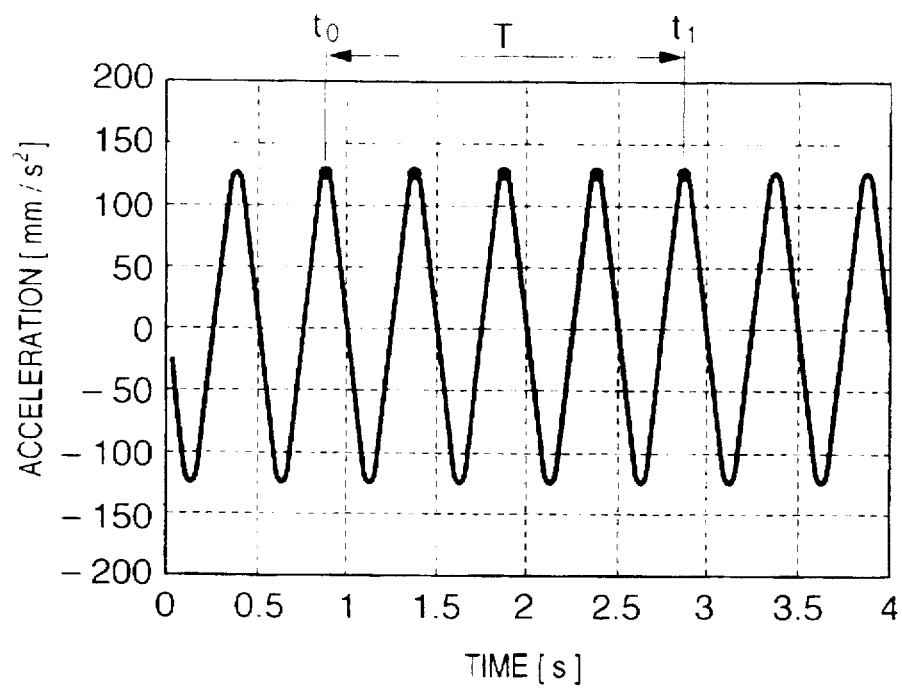
FIG. 21 is a graph showing how an acceleration in a time interval T is extracted by detecting a maximum value of the acceleration shown in FIGS. 20A and 20B.

Then, as illustrated in FIG. 21, a maximum value (or a minimum value) of the acceleration is detected, an acceleration for the duration of a predetermined number of pieces (a time interval T) is extracted. A frequency of the camera shake is generally on the order of 1-15 Hz, and hence, in this embodiment, the time interval T is set to 4 periods (2 sec) on the assumption that the frequency of the camera shake is 2 Hz.

Figure 22:
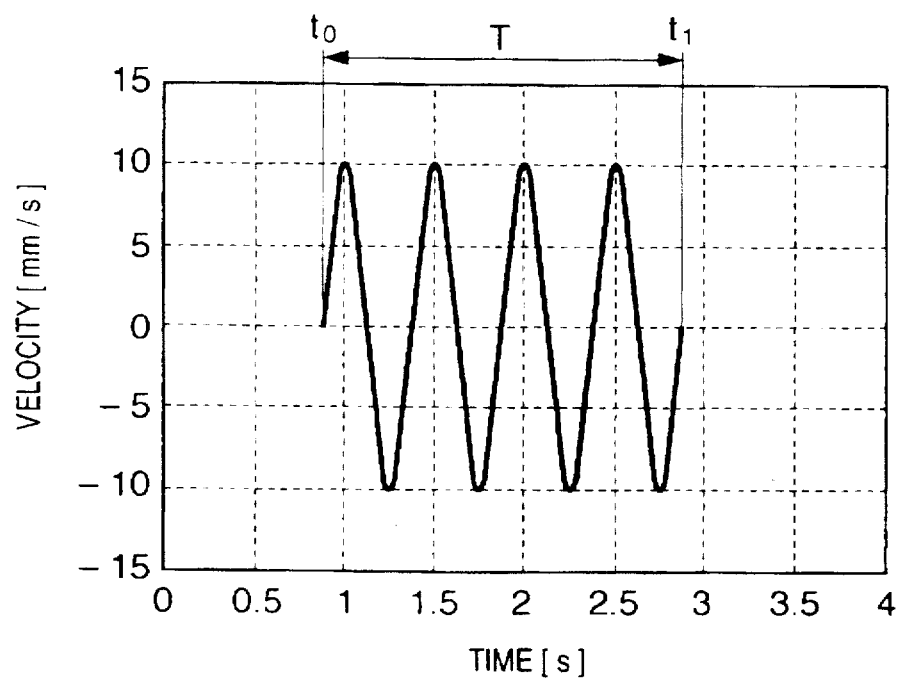
FIG. 22 is a graph showing a velocity calculated from the acceleration shown in FIGS. 20A and 20B.

Next, the velocity is calculated by integrating the thus extthus extracted acceleration while the initial velocity remained undetermined. Further, this velocity is integrated, thereby calculating a displacement. In the case of correcting the image shake in the camera, it may be sufficient that a relative displacement from the start of the integration is obtained, and therefore the initial displacement when starting the integration becomes unnecessary. That is, when calculating the displacement by integrating the velocity, the integration constant is not required. Accordingly, the displacement is obtained by executing the integration, wherein the initial displacement of the velocity is set to 0. Then, the initial velocity (the integration constant) is obtained on the assumption that a displacement at the timing t0 of the time interval T and a displacement at t1 thereof are equal. This is, as stated above, based on the assumption that the camera shake is of the periodic motion. FIG. 22 is a graph showing the thus calculated velocity. A velocity v1 at the timing t1 is thereby obtained.

Figure 23:
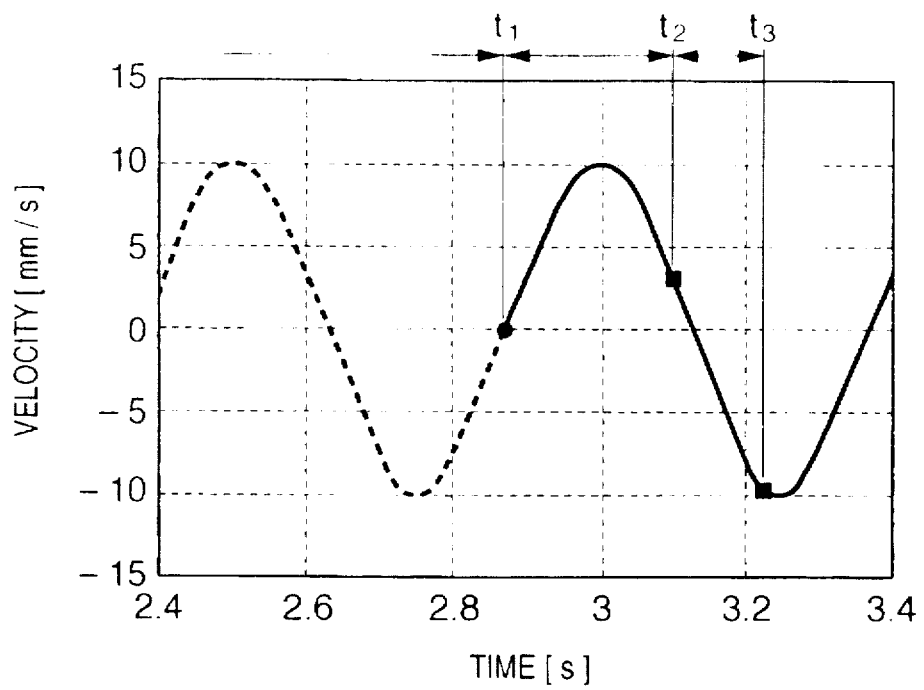
FIG. 23 is a graph showing a velocity after a timing t1.

Referring next to FIG. 23, if it is assumed that the shutter is kept open during a period from a timing t2 to a timing t3, the velocity is obtained by integrating the acceleration from the timing t1 to the timing t2, wherein the velocity at the timing t1 is set as the initial condition. A velocity v2 at the timing t2 is thereby obtained.

Figure 24:
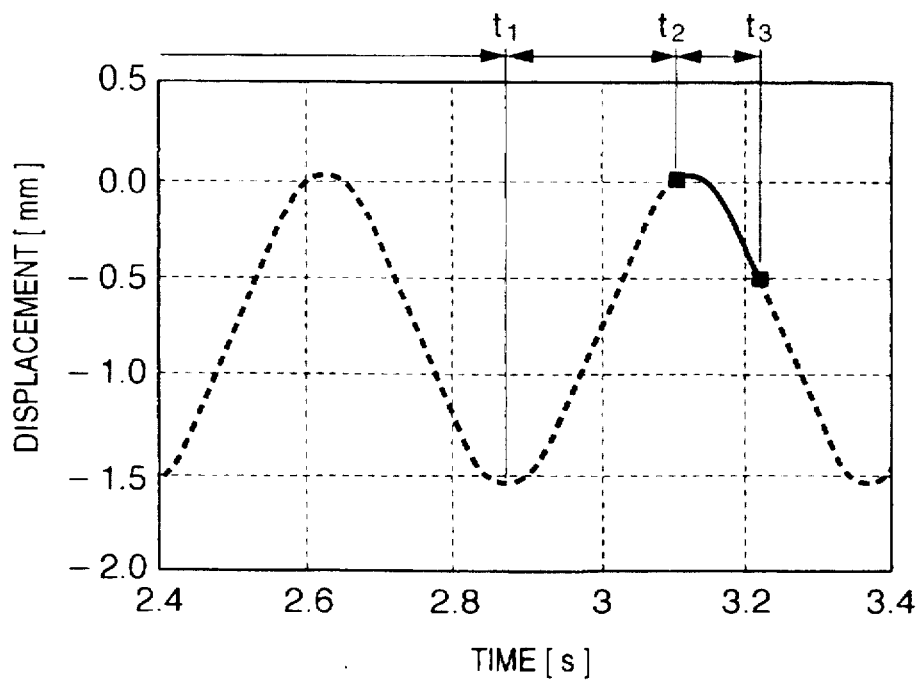
FIG. 24 is a graph showing a displacement from a timing t2 to a timing t3.

Then, referring to FIG. 24, the acceleration is integrated twice, wherein the velocity v2 at the timing t2 is set as an initial velocity (the integration constant), thus obtaining a displacement from the timing t2 to the timing t3. The displacement that should be obtained at this time is a relative displacement, and therefore the displacement at the timing t2 is 0.

With the calculation executed as described above, it is feasible to obtain the displacement during the shutter release, from the acceleration before releasing the shutter.

Note that the calculation method has been explained along a flow of time in the discussion given above, however, since the shutter release timing t2 is, as a matter of fact, a timing when the release button is depressed, the timing t2 can not be predicted in advance. For this reason, the velocity within this period of time is previously obtained from the acceleration in a time interval T1, and the last velocity in the time interval T1 is memorized. Then, even if a predetermined time elapses thereafter, and in case the release button is not depressed, the time interval is extended or shifted, and a velocity of that period of time is obtained from an acceleration in a time interval T2 or T3. Then, a velocity of the last timing of the time interval is memorized. The calculation continues to be executed by repeating the above operations till the release button is depressed.

When the release button is depressed, the velocity (the velocity v2 at the timing t2 in FIG. 23) at a timing when the release button is depressed, is obtained by using the velocity (the velocity v1 at the timing t1 in FIG. 23) obtained just anterior thereto, and a displacement (a displacement from the timing t2 to the timing t3 in FIG. 24) during the shutter release with the above velocity serving as an initial velocity.

By the way, in the case of obtaining the displacement by integrating the acceleration in the inertial navigation system employed for an airplane, etc., a time for obtaining the acceleration is long, and hence, if there is an error in the initial condition (e.g., the initial velocity, etc.), the displacement error get larger as a longer time elapses.

It is required that the displacement during the shutter release time be precisely obtained for correcting the image shake in the camera. A time therefor is 1 sec or less (⅟16 sec, ¼ sec, etc.). For example, an initial velocity error may be restrained down to 0.04 mm/s or smaller in order for the displacement error caused due to the initial velocity error to be restrained to 10 μm for ¼ sec.

The correction lens 38 is moved by using the signal into which the gravitational acceleration component is eliminated from the output values of the acceleration detectors 1, 2, whereby the image shake can be corrected without being influenced by the gravitational acceleration component enough to obtain the clear-cut image. Further, as explained above, the displacement can be calculated by obtaining the initial velocity at the time of starting the integration at the high efficiency.

Given next is an explanation of control of the calculation of the initial velocity and of the correction of the image shake.

Figure 25:
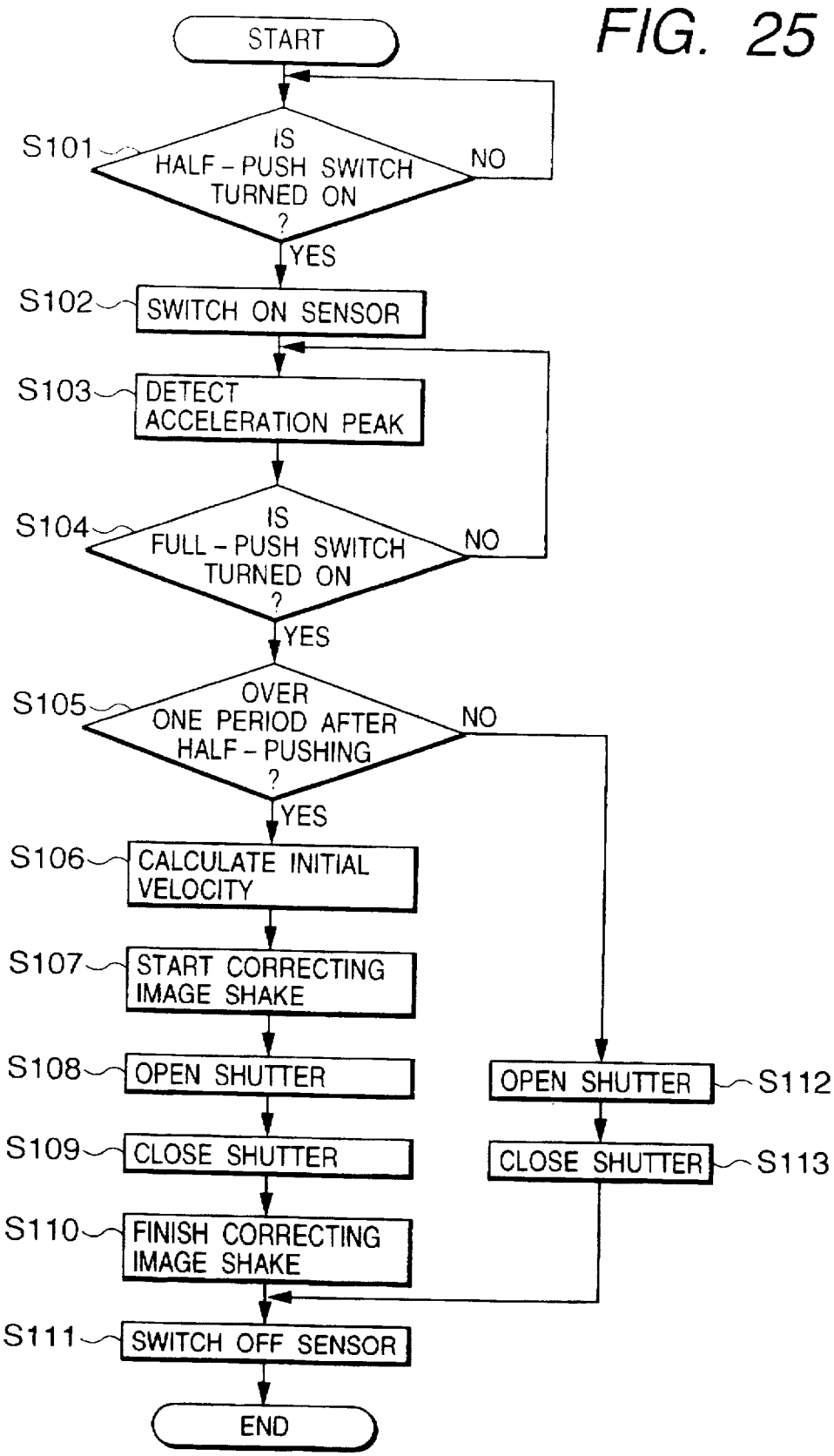
FIG. 25 is a flowchart showing one embodiment of a timing when pushing a release button and a correcting method thereat.

FIG. 25 is a flowchart showing a timing for depressing the release button and one embodiment of a correcting method at that time. In this example, only a uniaxial direction will be explained for simplicity.

When a half-push switch is turned ON in step 101, the processing proceeds to step 102 wherein the acceleration detector 1 is switched ON. Then, in next step 103, as shown in FIG. 21, a maximum value (a peak value) of the acceleration is detected. Then, whether or not a full-push switch is turned ON is checked in step 104. The maximum value of the acceleration is detected till the full-push switch is turned ON. When turned ON in step 104, the processing proceeds to step 105.

Checked in step 105 is whether or not the acceleration is detected with one or more periods till the full-push switch is turned ON since the half-push switch has been turned ON. When detected with one or more periods, the processing proceeds to step 106, in which the initial velocity is obtained by the above-described method. In next step 107, the image shake correcting operation is started. Then, after opening and closing the shutter in steps 108 and 109, the image shake correcting operation is ended in step 110, and the acceleration detector 1 is switched OFF in next step 111.

Whereas if the acceleration is not detected with one or more periods in step 105, it is impossible to make the calculations for obtaining the velocity and the displacements thereafter. Hence, the control is carried out so as not to correct the image shake, and the shutter is opened and closed in steps 112 and 113. Note that a warning purporting "no correction of image shake" may be, though not shown, made before step 112.

Figure 26:
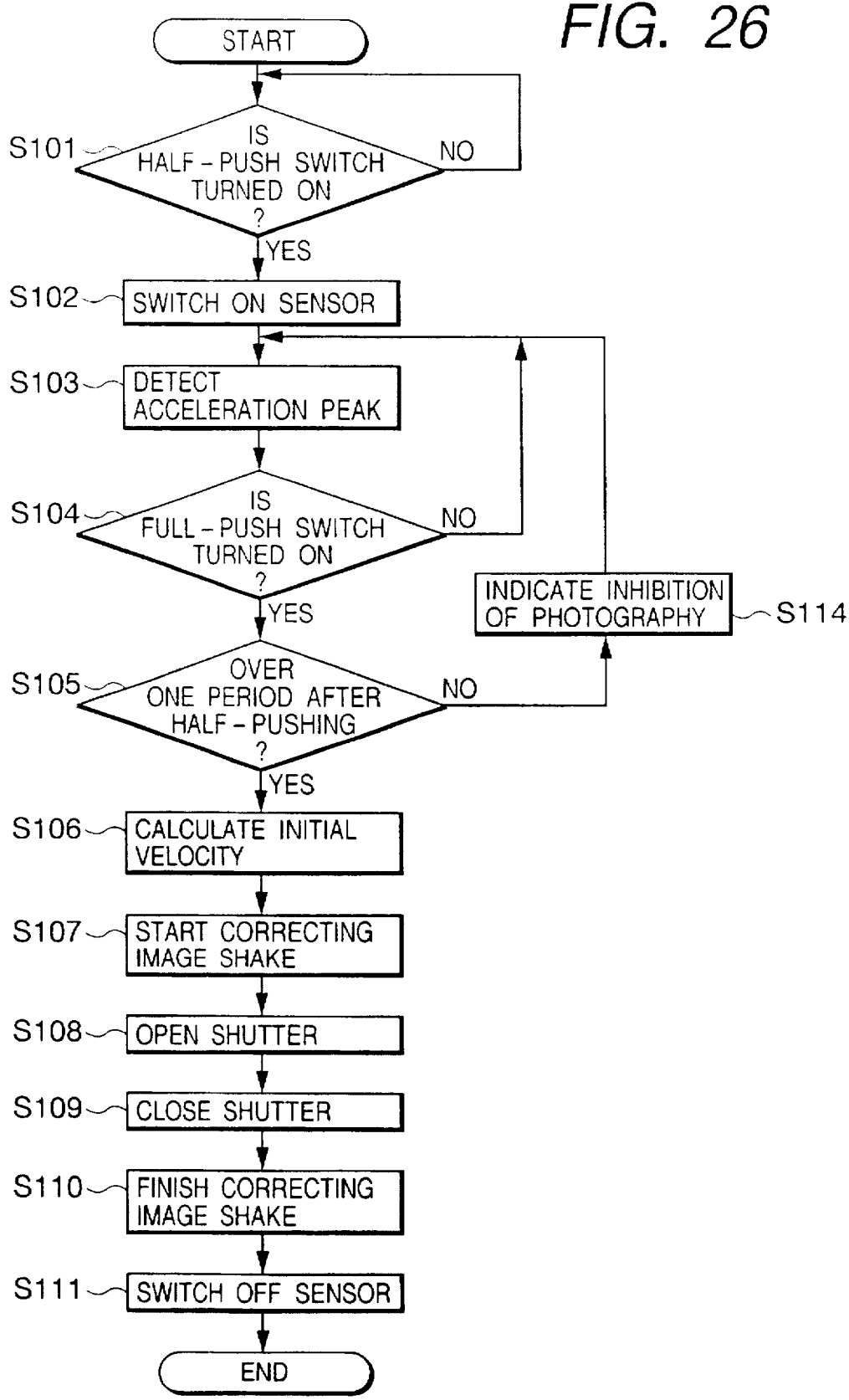
FIG. 26 is a flowchart showing a modified example of FIG. 25.
Figure 27:
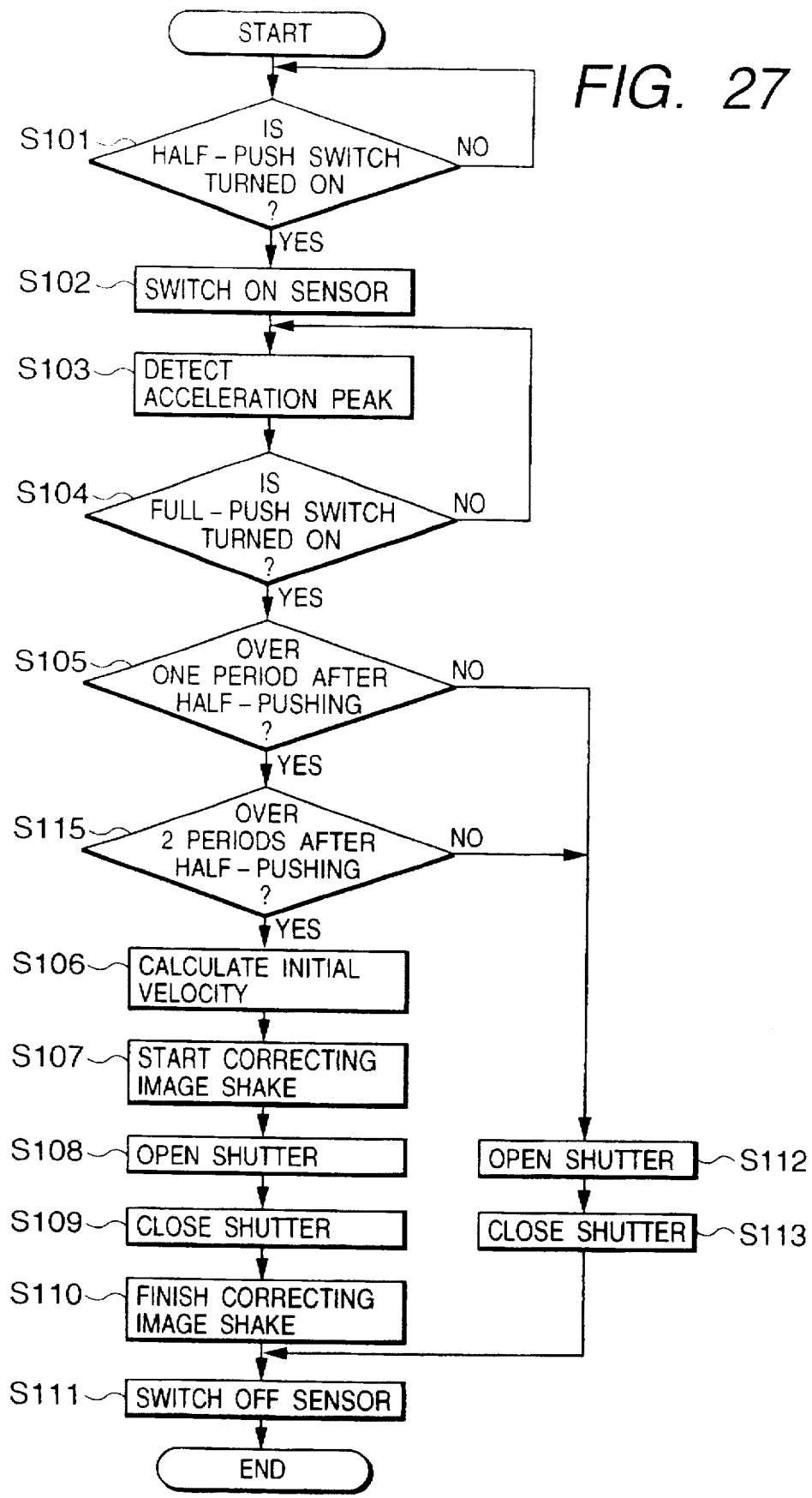
FIG. 27 is a flowchart showing a modified example of FIG. 25.
Figure 28:
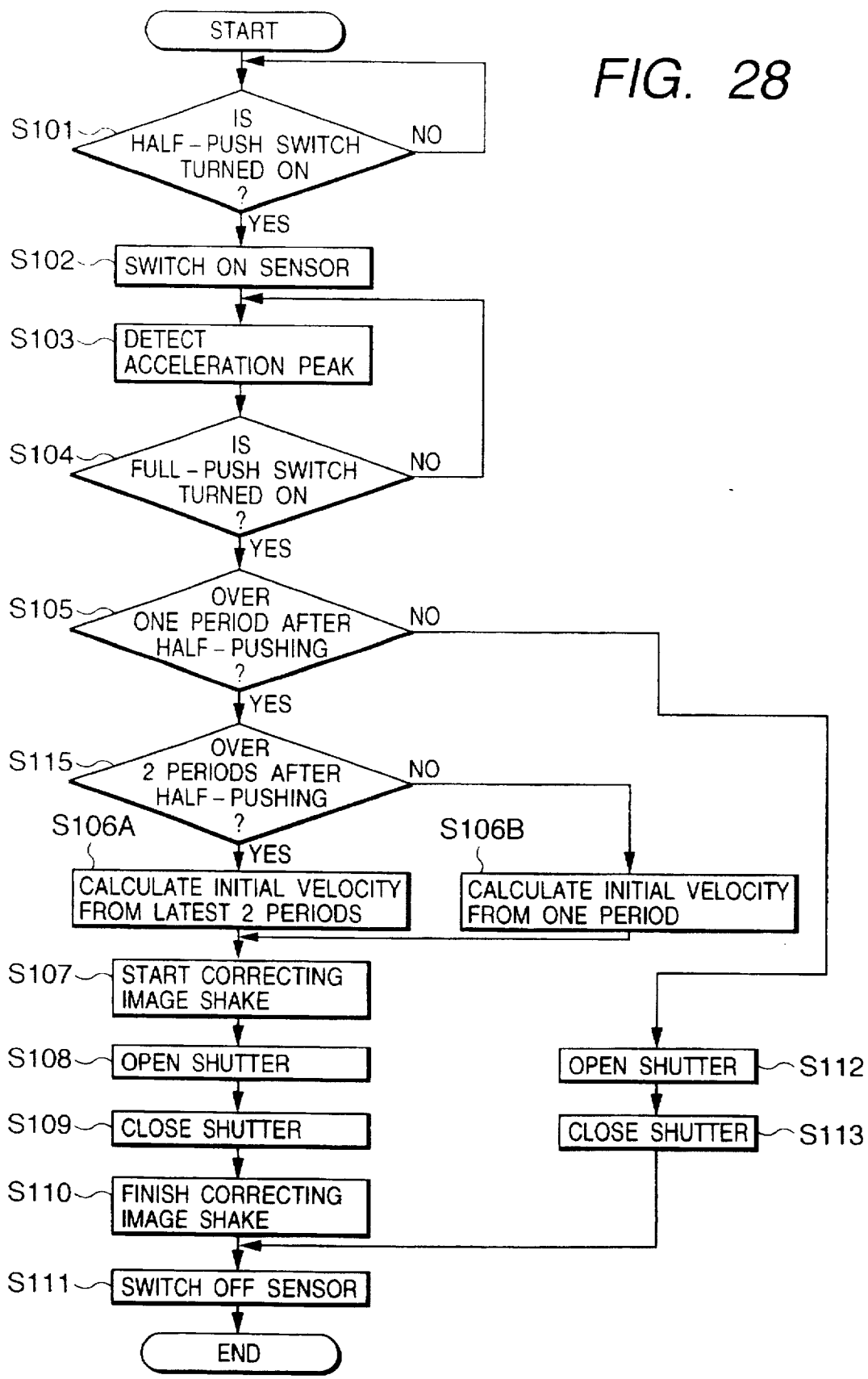
FIG. 28 is a flowchart showing a modified example of FIG. 25.

FIGS. 26 through 28 are flowcharts showing modified examples of FIG. 25.

In the modified example shown in FIG. 26, if the acceleration is not detected with one or more period till the full-push switch is turned ON after the half-push switch has been turned ON in step 105, an inhibition of the photography is indicated on an indicator (within a finder, etc.) in step 114 (the photographic process is not carried out).

Further, in the example shown in FIG. 27, if the acceleration is detected with one or more periods in same step 105 as the above-mentioned, the processing goes further to step 115, wherein whether or not 2 sec or more elapses till the full-push switch is turned ON since the half-push switch has been turned ON, is checked. Then, if 2 sec or more elapses, the processing proceeds to step 106, wherein the image shake is corrected, and the photographic process is effected. Whereas if 2 sec or more does not elapse, the processing proceeds to step 112, wherein not the image shake but the photographic process is executed.

Furthermore, in the example shown in FIG. 28, if 2 or more periods are detected till the full-push switch is turned ON since the half-push switch has been turned ON in step 115, the processing proceeds to step 106A, wherein the initial velocity is calculated based on the latest two periods. Whereas if 2 or more periods are not detected in step 115, the processing proceeds to step 106B, in which the initial velocity is calculated based on one period.

Note that the photographing may be inhibited without executing the ordinary photographic process in the examples shown in FIGS. 27 and 28 as in the case of FIG. 26.

Also, referring to FIG. 25, in accordance with this embodiment, the acceleration detector 1 is switched ON since the half-push switch has been turned ON for saving the consumption electric power. The process is not limited to this, but the acceleration detector 1 may be switched ON since the power switch of the camera has been turned ON.

Referring further to FIG. 25, in the case of biaxial acceleration detectors 1, 2, if the X-axis is one or more periods while the Y-axis is less than one period, the Y-axis does not satisfy the condition, and therefore the image shake may not be corrected. Moreover, referring to FIG. 23, if the X-axis is two or more periods while the Y-axis is over one period but less than two periods, the initial velocity may be calculated based on the two periods with respect to the X-axis and based on the one period with respect to the Y-axis.

Referring to FIGS. 25–28, the conditions for "2 sec", "1 period" and "2 periods" are not confined to the above-mentioned. It is desirable that the acceleration of over 4 periods be used for detecting the image shake quantity at a high accuracy.

If the photography takes place over a long period of time as in the case of a video camera, at a certain timing during the photography, a velocity obtained from an acceleration for a predetermined time before this timing, and a displacement can be calculated with the thus obtained velocity being set as an initial velocity. A cumulative displacement error can be reduced by repeating this process.

According to the invention of the present application, the initial velocity is obtained at the high efficiency from the acceleration acting upon the camera, and the image shake can be corrected.

Furthermore, according to the invention of the present application, the displacement and the initial velocity of the translational vibration are calculated by use of the acceleration outputs from which the gravitational acceleration component is eliminated, thereby correcting the image shake (the image shake and the defocus). Hence, even if there changes the gravitational acceleration component acting on the detection axis of the acceleration detecting unit due to the rotational vibrations, the image shake (the image shake and the defocus) can be accurately corrected, whereby the clear-cut image can be obtained.

According to the invention of the present application, it is feasible to save the consumption of electric power for the arithmetic unit such as the acceleration detecting unit and the velocity calculating unit.

According to the invention of the present application, whether or not the image shake should be corrected is determined based on the acceleration detection time, etc. given by the acceleration detecting unit, and therefore the image shake can be precisely corrected.

What is claimed is:

1. An image correcting camera comprising:
    an acceleration detecting unit to detect accelerations in X-, Y- and Z-axis directions orthogonal to each other, which accelerations act upon said camera;
    an angular velocity detecting unit to detect angular velocities about the tri-axes that act upon said camera;
    an attitude calculating unit to calculate a coordinate transform matrix between a camera coordinate system and a static coordinate system from an initial attitude of said camera with respect to the static coordinate system and from the angular velocities about the tri-axes;
    a gravitational acceleration component calculating unit to calculate a gravitational acceleration component in the camera coordinate system by use of the coordinate transform matrix;
    a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between said camera and the object, and the photographing magnification, and to determine a drive quantity of said image-shake correcting device on the basis of the image shake quantity; and a driving device to drive said image-shake correcting device on the basis of the drive quantity.

2. An image correcting camera according to claim 1, wherein said image-shake correcting device contains an optical system movable in directions orthogonal to an optical axis.

3. An image correcting camera according to claim 1, wherein said image-shake correcting device contains an imaging surface movable in directions orthogonal to the optical axis.

4. An image correcting camera according to claim 1, wherein said attitude calculating unit calculates the initial attitude of said camera with respect to the static coordinate system from a gravitational acceleration direction in the camera coordinate system that is obtained from the accelerations in the tri-axis directions.

5. An image correcting camera comprising:

an acceleration detecting unit to detect accelerations in X-, Y- and Z-axis directions orthogonal to each other, which accelerations act upon said camera;

an angular velocity detecting unit to detect angular velocities about the X- and Y-axes and a Z-axis orthogonal thereto that act upon said camera;

an attitude detecting unit to detect an attitude of said camera by detecting a gravitational acceleration direction;

an attitude calculating unit to calculate a coordinate transform matrix between a camera coordinate system and a static coordinate system from the attitude of said camera and from angular velocities about the tri-axes;

a gravitational acceleration component calculating unit to calculate a gravitational acceleration component in the camera coordinate system by use of the coordinate transform matrix;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions, angles of rotations about X- and Y-axes that are calculated from the angular velocities about the X- and Y-axes, a distance between said camera and the object, and the photographing magnification, and to determine a drive quantity of said image-shake correcting device on the basis of the image shake quantity; and a driving device to drive said image-shake correcting device on the basis of the drive quantity.

6. An image correcting camera according to claim 5, wherein said image-shake correcting device contains an optical system movable in directions orthogonal to an optical axis.

7. An image correcting camera according to claim 5, wherein said image-shake correcting device contains an imaging surface movable in directions orthogonal to the optical axis.

8. An image correcting camera comprising:

an acceleration detecting unit to detect accelerations in X-, Y- and Z-axis directions orthogonal to each other, which accelerations act upon said camera;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an object distance measuring unit to measure a distance between said camera and an object;

a photographing magnification detecting unit to detect a photographing magnification of said camera;

a focusing lens;

a drive quantity calculating unit to calculate an image shake quantity and a defocus quantity on the basis of the displacements in tri-axis directions, angles of rotations about tri-axes that are calculated from angular velocities about the tri-axes, a distance between said camera and the object, and the photographing magnification, and to determine a drive quantity of said focusing lens on the basis of the image shake quantity, a drive quantity of a correction lens or an imaging surface and the defocus quantity; and a driving device to drive respectively said correction lens or said imaging surface and said focusing lens on the basis of the drive quantity.

9. An image correcting camera according to claim 8, wherein said attitude calculating unit calculates the initial attitude of said camera with respect to the static coordinate system from the gravitational acceleration direction in the camera coordinate system that is obtained from the accelerations in the tri-axis directions.

10. An image correcting camera comprising:
an acceleration detecting unit to detect an acceleration acting upon said camera together with a time;
a velocity calculating unit to calculate a velocity from a period acceleration by determining the period acceleration between a first peak and a last peak during a predetermined period in a curvilinear line depicted by the detected acceleration versus the time, and by assuming that a displacement of said camera at the first peak point and a displacement thereof at the last peak point are equal;
a displacement calculating unit to calculate a displacement during the correction of the image shake from the velocity calculated by said velocity calculating unit;
an image-shake correcting device;
a drive quantity determining unit to calculate an image shake quantity on the basis of the displacement calculated by said displacement calculating unit, and to determine a drive quantity of said image-shake correcting device on the basis of the image shake quantity; and
a driving device to drive said image-shake correcting device on the basis of the drive quantity.

11. An image correcting camera according to claim 10, wherein said image-shake correcting device contains an optical system movable in directions orthogonal to an optical axis.

12. An image correcting camera according to claim 10, wherein said image-shake correcting device contains an imaging surface movable in directions orthogonal to the optical axis.

13. An image correcting camera according to claim 10, wherein said velocity calculating unit calculates the velocity from the acceleration till a full-push switch is turned ON after a half-push switch has been turned ON.

14. An image correcting camera according to claim 10, wherein said velocity calculating unit, when said acceleration detecting unit detects an acceleration with one or more periods, calculates the velocity, and
the image shake is not corrected when said acceleration detecting unit does not detect the acceleration with one or more periods.

15. An image correcting camera according to claim 14, wherein a photographic process is stopped when said acceleration detecting unit does not detect the acceleration with one or more periods.

16. An image correcting camera according to claim 10, wherein said velocity calculating unit, when said acceleration detecting unit detects that the acceleration direction changes twice or more within the predetermined period, calculates the velocity, and
the image shake is not corrected when said acceleration detecting unit detects that the acceleration direction changes only once or less within the predetermined period.

17. An image correcting camera according to claim 16, wherein when said acceleration detecting unit detects that the acceleration direction changes only once or less within the predetermined period, the photographic process is stopped.

18. An image correcting camera according to claim 16, wherein when said acceleration detecting unit detects that the acceleration direction changes only once or less within the predetermined period, the image shake is not corrected.

19. An image correcting camera according to claim 16, wherein when said acceleration detecting unit detects that the acceleration direction changes only once or less within the predetermined period, the photographic process continues.

20. An image correcting camera comprising:
an acceleration detecting unit to detect accelerations acting upon said camera together with a time in X-, Y- and Z-axis directions orthogonal to each other;
an angular velocity detecting unit to detect angular velocities about the tri-axes that act upon said camera;
an attitude calculating unit to calculate a coordinate transform matrix between a camera coordinate system and a static coordinate system from an initial attitude of said camera with respect to the static coordinate system and from the angular velocities about the tri-axes;
a gravitational acceleration component calculating unit to calculate a gravitational acceleration component in the camera coordinate system by use of the coordinate transform matrix;
a velocity calculating unit to calculate a velocity from a period acceleration by determining the period acceleration between a first peak and a last peak during a predetermined period in a curvilinear line depicted by the acceleration with an elimination of the gravitational acceleration component versus the time, and by assuming that a displacement of said camera at the first peak point and a displacement thereof at the last peak point are equal;
a displacement calculating unit to calculate a displacement during the correction of the image shake from the velocity calculated by said velocity calculating unit;
an object distance measuring unit to measure a distance between said camera and an object;
a photographing magnification detecting unit to detect a photographing magnification of said camera;
an image-shake correcting device;
a correction quantity calculating unit to calculate an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between said camera and the object, and the photographing magnification, and to determine a drive quantity of said image-shake correcting device on the basis of the image shake quantity; and
a driving device to drive said image-shake correcting device on the basis of the drive quantity.

21. An image correcting camera according to claim 20, wherein said image-shake correcting device contains an optical system movable in directions orthogonal to an optical axis.

22. An image correcting camera according to claim 20, wherein said image-shake correcting device contains an imaging surface movable in directions orthogonal to the optical axis.

23. An image correcting camera according to claim 20, wherein said velocity calculating unit calculates the velocity from the acceleration till the full-push switch is turned ON after the half-push switch has been turned ON.

24. An image correcting camera according to claim 20, wherein said velocity calculating unit, when said acceleration detecting unit detects an acceleration with one or more periods, calculates the velocity, and
the image shake is not corrected when said acceleration detecting unit does not detect the acceleration with one or more periods.

25. An image correcting camera according to claim 24, wherein a photographic process is stopped when said acceleration detecting unit does not detect the acceleration with one or more periods.

26. An image correcting camera according to claim 20, wherein said velocity calculating unit, when said acceleration detecting unit detects that the acceleration direction changes twice or more within the predetermined period, calculates the velocity, and the image shake is not corrected when said acceleration detecting unit detects that the acceleration direction changes only once or less within the predetermined period.

27. An image correcting camera according to claim 26, wherein when said acceleration detecting unit detects that the acceleration direction changes only once or less within the predetermined period, the photographic process is stopped.

28. An image correcting camera according to claim 26, wherein said attitude calculating unit determines an attitude of said camera with respect to the static coordinate system from the gravitational acceleration direction in the camera coordinate system that is obtained from the accelerations in the tri-axis directions.

29. An image correcting camera comprising:

an acceleration detecting unit to detect accelerations acting upon said camera together with a time in X- and Y-axis directions orthogonal to each other;

an angular velocity detecting unit to detect angular velocities about X- and Y-axes and a Z-axis orthogonal thereto;

an attitude detecting unit to detect an attitude of said camera by detecting a gravitational acceleration direction;

an attitude calculating unit to calculate a coordinate transform matrix between a camera coordinate system and a static coordinate system from the attitude of said camera and from the angular velocities about the tri-axes;

a gravitational acceleration component calculating unit to calculate a gravitational acceleration component in the camera coordinate system by use of the coordinate transform matrix;

a velocity calculating unit to calculate a velocity from a period acceleration by determining the period acceleration between a first peak and a last peak during a predetermined period in a curvilinear line depicted by the acceleration with an elimination of the gravitational acceleration component versus the time, and by assuming that a displacement of said camera at the first peak point and a displacement thereof at the last peak point are equal;

a displacement calculating unit to calculate a displacement during the correction of the image shake from the velocity calculated by said velocity calculating unit;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions, angles of rotations about X- and Y-axes that are calculated from the angular velocities about the X- and Y-axes, a distance between said camera and the object, and the photographing magnification, and to determine a drive quantity of said image-shake correcting device on the basis of the image shake quantity; and a driving device to drive said image-shake correcting device on the basis of the drive quantity.

30. An image correcting camera according to claim 29, wherein said image-shake correcting device contains an optical system movable in directions orthogonal to an optical axis.

31. An image correcting camera according to claim 29, wherein said image-shake correcting device contains an imaging surface movable in directions orthogonal to the optical axis.

32. An image correcting camera according to claim 29, wherein said velocity calculating unit calculates the velocity from the acceleration till the full-push switch is turned ON after the half-push switch has been turned ON.

33. An image correcting camera according to claim 29, wherein said velocity calculating unit, when said acceleration detecting unit detects an acceleration with one or more periods, calculates the velocity, and the image shake is not corrected when said acceleration detecting unit does not detect the acceleration with one or more periods.

34. An image correcting camera according to claim 33, wherein a photographic process is stopped when said acceleration detecting unit does not detect the acceleration with one or more periods.

35. An image correcting camera according to claim 33, wherein a warning purporting that the image shake is not corrected is given when said acceleration detecting unit detects that the acceleration direction changes only once or less within the predetermined period.

36. An image correcting camera according to claim 35, wherein when said acceleration detecting unit detects that the acceleration direction changes only once or less within the predetermined period, the photographic process continues.

37. An image correcting camera according to claim 29, wherein said velocity calculating unit, when said acceleration detecting unit detects that the acceleration direction changes twice or more within the predetermined period, calculates the velocity, and the image shake is not corrected when said acceleration detecting unit detects that the acceleration direction changes only once or less within the predetermined period.

38. An image correcting camera according to claim 37, wherein when said acceleration detecting unit detects that the acceleration direction changes only once or less within the predetermined period, the photographic process is stopped.

39. An image correcting camera comprising:

an acceleration detecting unit to detect accelerations acting upon said camera together with a time in X-, Y- and Z-axis directions orthogonal to each other;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a velocity calculating unit to calculate a velocity from a period acceleration by determining the period acceleration between a first peak and a last peak during a predetermined period in a curvilinear line depicted by the acceleration with an elimination of the gravitational acceleration component versus the time, and by assuming that a displacement of said camera at the first peak point and a displacement thereof at the last peak point are equal;

a displacement calculating unit to calculate a displacement during the correction of the image shake from the velocity calculated by said velocity calculating unit;

an object distance measuring unit to measure a distance between said camera and an object;

a photographing magnification detecting unit to detect a photographing magnification of said camera;

a focusing lens;

a drive quantity calculating unit to calculate a defocus quantity on the basis of the displacements in the tri-axis directions, angles of rotations about tri-axes that are calculated from the angular velocities about the tri-axes, a distance between said camera and the object, and the photographing magnification, and to determine a drive quantity of said focusing lens based on the image shake quantity or based on the drive quantity of a correction lens or of an imaging surface, and based on the defocus quantity; and a driving device to drive respectively said correction lens or said imaging surface and said focusing lens on the basis of the drive quantity.

40. An image correcting camera according to claim 39, wherein said velocity calculating unit calculates the velocity from the acceleration till the full-push switch is turned ON after the half-push switch has been turned ON.

41. An image correcting camera according to claim 39, wherein said velocity calculating unit, when said acceleration detecting unit detects an acceleration with one or more periods, calculates the velocity, and the image shake is not corrected when said acceleration detecting unit does not detect the acceleration with one or more periods.

42. An image correcting camera according to claim 41, wherein a photographic process is stopped when said acceleration detecting unit does not detect the acceleration with one or more periods.

43. An image correcting camera according to claim 41, wherein said velocity calculating unit, when said acceleration detecting unit detects that the acceleration direction changes twice or more within the predetermined period, calculates the velocity, and the image shake is not corrected when said acceleration detecting unit detects that the acceleration direction changes only once or less within the predetermined period.

44. An image correcting camera according to claim 43, wherein when said acceleration detecting unit detects that the acceleration direction changes only once or less within the predetermined period, the photographic process is stopped.

45. An image correcting camera according to claim 39, wherein said attitude calculating unit determines an attitude of said camera with respect to the static coordinate system from the gravitational acceleration direction in the camera coordinate system that is obtained from the accelerations in the tri-axis directions.

46. A method for image movement correction in a camera, comprising:

detecting accelerations in first, second and third axial directions;

detecting angular velocities about the first, second and third axes;

calculating a gravitational acceleration component in a camera coordinate system based on an initial attitude of a camera with respect to a static coordinate system and the angular velocities about the first, second and third axes;

calculating a displacement based on the acceleration and the gravitational acceleration component;

performing image-shake correction based on the calculated displacement, a distance between the camera and an object to be photographed, and a photographing magnification of the camera.

47. A method according to claim 46, wherein said displacement calculating comprises:

calculating an initial velocity from the acceleration with an elimination of the gravitational acceleration component;

calculating a velocity from the initial velocity and from the acceleration with an elimination of the gravitational acceleration component; and calculating the displacement from the calculated velocity.

48. A method according to claim 46, wherein said image shake correction performing comprises:

measuring the distance between the camera and the object to be photographed;

determining the photographing magnification of the camera;

calculating an image shake quantity on the basis of the displacements in X and Y-axis directions or in tri-axis directions, angles of rotations about X and Y-axes or about tri-axes that are calculated from the angular velocities about the X and Y-axes or about the tri-axes, the distance between the camera and the object, and the photographing magnification;

determining a drive quantity for an image shake correcting device on the basis of the image shake quantity; and driving the image shake correcting device on the basis of the drive quantity.

49. A method according to claim 46, wherein said gravitational acceleration component calculating comprises:

calculating a coordinate transform matrix between the camera coordinate system and the static coordinate system from the initial attitude of the camera with respect to the static coordinate system and from the angular velocities about the tri-axes;

calculating the gravitational acceleration component in the camera coordinate system using the coordinate transform matrix.

50. A method for image movement correction in a camera, comprising:

detecting an acceleration acting upon the camera together with a time;

calculating a velocity from a period acceleration between a first peak and a last peak during a predetermined period in a curvilinear line depicted by the detected acceleration versus the time, and by assuming that a displacement of the camera at the first peak point and a displacement thereof at the last peak point are equal;

calculating a displacement during the correction of the image shake from the calculated velocity; and performing image-shake correction based on the calculated displacement.

51. A method according to claim 50, further comprising:

detecting angular velocities about the first, second and third axes;

calculating a gravitational acceleration component in a camera coordinate system based on an initial attitude of a camera with respect to a static coordinate system and the angular velocities about the first, second and third axes, wherein the curvilinear line is depicted by the detected acceleration with an elimination of the gravitational acceleration component versus time.

52. A method according to claim 51, wherein said gravitational acceleration component calculating comprises:

calculating a coordinate transform matrix between a camera coordinate system and the static coordinate system from the initial attitude of the camera with respect to the static coordinate system and from the angular velocities about the first, second and third axes; and calculating the gravitational acceleration component in the camera coordinate system using the coordinate transform matrix.

53. A method according to claim 50, wherein said image-shake correction performing comprises:

measuring the distance between the camera and the object to be photographed;

determining a photographing magnification of the camera;

calculating an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, the distance between the camera and the object, and the photographing magnification;

determining a drive quantity for an image shake correcting device on the basis of the image shake quantity; and driving the image shake correcting device on the basis of the drive quantity.

54. A camera having an image-shake correcting device, comprising:

an acceleration detecting unit to detect an acceleration in a linear direction acting on said camera;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an image-shake quantity determining device to determine an image-shake quantity on the basis of the determined displacement;

a drive quantity determining device to determine a drive quantity of said image-shake correcting device on the basis of the determined image-shake quantity; and a driving device to drive said image-shake correcting device on the basis of the drive quantity.

55. An image correcting camera comprising:

an acceleration detecting unit to detect accelerations in X- and Y-axis directions orthogonal to each other, which accelerations act upon said camera;

an angular velocity detecting unit to detect angular velocities about the X- and Y-axes and a Z-axis orthogonal thereto that act upon said camera;

an attitude detecting unit to detect an attitude of said camera by detecting a gravitational acceleration direction;

an attitude calculating unit to calculate a coordinate transform matrix between a camera coordinate system and a static coordinate system from the attitude of said camera and from angular velocities about the tri-axes;

a gravitational acceleration component calculating unit to calculate a gravitational acceleration component in the camera coordinate system by use of the coordinate transform matrix;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions, angles of rotations about X- and Y-axes that are calculated from the angular velocities about the X- and Y-axes, a distance between said camera and the object, and the photographing magnification, and to determine a drive quantity of said image-shake correcting device on the basis of the image shake quantity; and a driving device to drive said image-shake correcting device on the basis of the drive quantity.

56. An image correcting camera comprising:

an acceleration detecting unit to detect accelerations in X- and Y-axis directions orthogonal to each other, which accelerations act upon said camera;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between said camera and the object, and the photographing magnification, and to determine a drive quantity of said image-shake correcting device on the basis of the image shake quantity; and a driving device to drive said image-shake correcting device on the basis of the drive quantity.

57. An image correcting camera comprising:

an acceleration detecting unit to detect accelerations in X- and Y-axis directions orthogonal to each other, which accelerations act upon said camera;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a displacement calculating unit to calculate an initial velocity from the acceleration with an elimination of the gravitational acceleration component, to calculate a velocity from the initial velocity and from the acceleration with an elimination of the gravitational acceleration component, and to calculate a displacement from the velocity, an object distance measuring unit to measure a distance between said camera and an object;

a photographing magnification detecting unit to detect a photographing magnification of said camera;

a focusing lens;

a drive quantity calculating unit to calculate an image shake quantity and a defocus quantity on the basis of the displacements in tri-axis directions, angles of rotations about tri-axes that are calculated from angular velocities about the tri-axes, a distance between said camera and the object, and the photographing magnification, and to determine a drive quantity of said focusing lens on the basis of the image shake quantity, a drive quantity of a correction lens or an imaging surface and the defocus quantity; and a driving device to drive respectively said correction lens or said imaging surface and said focusing lens on the basis of the drive quantity.

58. An image correcting camera comprising;

an acceleration detecting unit to detect an acceleration acting upon said camera together with a time in two axial directions;

a velocity calculating unit to calculate a velocity from a period acceleration by determining the period acceleration between a first peak and a last peak during a predetermined period in a curvilinear line depicted by the detected acceleration versus the time, and by assuming that a displacement of said camera at the first peak point and a displacement thereof at the last peak point are equal;

a displacement calculating unit to calculate a displacement during the correction of the image shake from the velocity calculated by said velocity calculating unit;

an image-shake correcting device;

a drive quantity determining unit to calculate an image shake quantity on the basis of the displacement calculated by said displacement calculating unit, and to determine a drive quantity of said image-shake correcting device on the basis of the image shake quantity; and a driving device to drive said image-shake correcting device on the basis of the drive quantity.

59. An image correcting camera comprising:

an acceleration detecting unit to detect accelerations acting upon said camera together with a time in X- and Y-axis directions orthogonal to each other;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a velocity calculating unit to calculate a velocity from a period acceleration by determining the period acceleration between a first peak and a last peak during a predetermined period in a curvilinear line depicted by the acceleration with an elimination of the gravitational acceleration component versus the time, and by assuming that a displacement of said camera at the first peak point and a displacement thereof at the last peak point are equal;

a displacement calculating unit to calculate a displacement during the correction of the image shake from the velocity calculated by said velocity calculating unit;

an object distance measuring unit to measure a distance between said camera and an object;

a photographing magnification detecting unit to detect a photographing magnification of said camera;

an image-shake correcting device;

a correction quantity calculating unit to calculate an image shake quantity on the basis of the displacements in X- and Y-axis directions or in tri-axis directions, angles of rotations about X- and Y-axes or about tri-axes that are calculated from the angular velocities about the X- and Y-axes or about the tri-axes, a distance between said camera and the object, and the photographing magnification, and to determine a drive quantity of said image-shake correcting device on the basis of the image shake quantity; and a driving device to drive said image-shake correcting device on the basis of the drive quantity.

60. An image correcting camera comprising:

an acceleration detecting unit to detect accelerations acting upon said camera together with a time in X- and Y-axis directions orthogonal to each other;

an angular velocity detecting unit to detect angular velocities about the tri-axes that act upon said camera;

an attitude calculating unit to calculate a coordinate transform matrix between a camera coordinate system and a static coordinate system from an initial attitude of said camera with respect to the static coordinate system and from the angular velocities about the tri-axes;

a gravitational acceleration component calculating unit to calculate a gravitational acceleration component in the camera coordinate system by use of the coordinate transform matrix;

a velocity calculating unit to calculate a velocity from a period acceleration by determining the period acceleration between a first peak and a last peak during a predetermined period in a curvilinear line depicted by the acceleration with an elimination of the gravitational acceleration component versus the time, and by assuming that a displacement of said camera at the first peak point and a displacement thereof at the last peak point are equal;

a displacement calculating unit to calculate a displacement during the correction of the image shake from the velocity calculated by said velocity calculating unit;

an object distance measuring unit to measure a distance between said camera and an object;

a photographing magnification detecting unit to detect a photographing magnification of said camera;

a focusing lens;

a drive quantity calculating unit to calculate a defocus quantity on the basis of the displacements in the tri-axis directions, angles of rotations about tri-axes that are calculated from the angular velocities about the tri-axes, a distance between said camera and the object, and the photographing magnification, and to determine a drive quantity of said focusing lens based on the image shake quantity or based on the drive quantity of a correction lens or of an imaging surface, and based on the defocus quantity; and a driving device to drive respectively said correction lens or said imaging surface and said focusing lens on the basis of the drive quantity.

* * * * *

UNITED STATES PATENT AND TRADEMARK OFFICE
CERTIFICATE OF CORRECTION

PATENT NO. : 5,794,078
DATED : August 11, 1998
INVENTOR(S) : Mitsuhiro Okazaki

It is certified that error appears in the above-indentified patent and that said Letters Patent is hereby corrected as shown below:

Column 19, line 63, claim 19, change "16" to --18--.

Signed and Sealed this

Twelfth Day of January, 1999

Attest:

Attesting Officer

*Acting Commissioner of Patents and Trademarks*